(12) United States Patent
Levy et al.

(10) Patent No.: US 6,689,861 B2
(45) Date of Patent: *Feb. 10, 2004

(54) DERIVATIZED POLYURETHANE COMPOSITIONS WHICH EXHIBIT ENHANCED STABILITY IN BIOLOGICAL SYSTEMS AND METHODS OF MAKING THE SAME

(75) Inventors: Robert J. Levy, Merion Station, PA (US); Ivan Alferiev, Clementon, NJ (US)

(73) Assignee: The Children's Hospital of Philadelphi, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/985,316

(22) Filed: Nov. 2, 2001

(65) Prior Publication Data

US 2002/0123599 A1 Sep. 5, 2002

Related U.S. Application Data

(63) Continuation of application No. 09/620,857, filed on Jul. 21, 2000, now Pat. No. 6,320,011.
(60) Provisional application No. 60/145,318, filed on Jul. 23, 1999.

(51) Int. Cl.$^7$ ............................................. C08G 18/83
(52) U.S. Cl. ........................ 528/72; 521/53; 525/452; 525/453; 525/454
(58) Field of Search ................. 525/452, 453, 525/454; 528/72; 521/53

(56) References Cited

U.S. PATENT DOCUMENTS

| 4,642,242 A | 2/1987 | Solomon et al. | 427/2 |
| 4,746,654 A | 5/1988 | Breliere et al. | 514/108 |
| 5,159,050 A | 10/1992 | Onwumere | 528/67 |
| 5,855,618 A | 1/1999 | Patnaik et al. | 623/11 |

FOREIGN PATENT DOCUMENTS

| WO | WO 95 20008 A | 7/1995 |

OTHER PUBLICATIONS

Sivriev H et al., "Phosphorus–Containing Polyurethanes, Prepared by N–Modification", European Polymer Journal, 1990, pp. 73–76, vol. 26, No. 1, Pergamon Press Ltd., Oxford, GB.

Joshi, R. et al. "Calcification of polyurethanes implanted subdermally in rats is enhanced by calciphylaxis," *Journal of Biomedical Materials Research*, vol. 31, pp. 201–207, John Wiley & Sons, 1996.

Grasel, T., "Effects of alkyl grafting on surface properties and blood compatibility of polyurethane block copolymers," *Journal of Biomedical Materials Research*, vol. 21, pp. 815–842, John Wiley & Sons, 1987.

Mikroyannidis, J.,, "Phosphorus–containing polyurethanes and copolyurethanes based on 12–Dihydroxy–1,2–bis(di-ethoxyphosphinyl)ethane," *Journal of Polymer Science*, Polymer Chemistry Edition, vol. 22, pp. 891–903, John Wiley & Sons, 1984.

Adibi, K., "Anionic synthesis of poly(urethane–g–acrylonitrile)," *Polymer*, vol. 20, pp. 483–487, IPC Business Press, 1979.

*Primary Examiner*—Rachel Gorr
(74) *Attorney, Agent, or Firm*—Caesar, Rivise, Bernstein, Cohen & Poktilow, Ltd.

(57) ABSTRACT

The invention relates to methods of making polyurethane derivatives which can be readily further derivatized using stabilizing agents such as anti-calcification agents, anti-thrombogenesis agents, and chemical and mechanical degradation-inhibiting agents. The invention also includes methods of making polyurethane derivatives so further derivatized and to polyurethanes derivatives made using such methods.

11 Claims, 7 Drawing Sheets

DERIVATIZED POLYURETHANE COMPOSITIONS WHICH EXHIBIT ENHANCED STABILITY IN BIOLOGICAL SYSTEMS AND METHODS OF MAKING THE SAME

CROSS-REFERENCE TO RELATED APPLICATIONS

This application is entitled to priority pursuant to 35 U.S.C. §119 (e) to U.S. provisional patent application No. 60/145,318 filed Jul. 23, 1999 and U.S. utility patent application 09/620,857 filed Jul., 21, 2000, issued as U.S. Pat. No. 6,320,011. +gi

STATEMENT REGARDING FEDERALLY SPONSORED RESEARCH OR DEVELOPMENT

This research was supported in part by U.S. Government funds (National Heart, Lung and Blood Institute grant number NHLBI59730), and the U.S. Government may therefore have certain rights in the invention.

REFERENCE TO A MICROFICHE APPENDIX

Not applicable.

BACKGROUND OF THE INVENTION

The field of the invention is improved polyurethane compositions for in vitro and in vivo use, including calcification-resistant, thrombogenesis-resistant, and degradation-resistant polyurethanes.

Polyurethanes are polymers which can be made by condensing a diisocyanate with a diol, with two or more diols having different structures, or with both a diol and a diamine. For example, polyurethanes can be made as illustrated in FIGS. 1A and 1B. In FIG. 1A, a diisocyanate (OCN—A—CNO) is reacted with a diol (HO—X—OH) to form a polyurethane. It is understood that the proportion of end groups corresponding to the diisocyanate and the diol can be controlled by using an excess of the desired end group. For example, if the reaction in FIG. 1A is performed in the presence of an excess of the diisocyanate, then the resulting polyurethane will have isocyanate (—NCO) groups at each end.

Depending on the identity of the reaction products used to form them, polyurethanes can behave as elastomers or as rigid, hard thermosets. If the diisocyanate depicted in FIG. 1A is, for example, 4,4'-methylenebis(phenylisocyanate), which has the following structure,

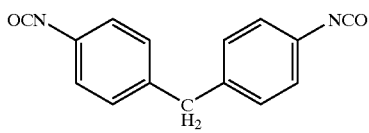

then the region designated "HS" (i.e., 'hard segment') in FIG. 1A will be relatively inflexible. If the diol depicted in FIG. 1A is, for example, polytetramethyleneoxide (i.e., HO—(CH$_2$CH$_2$CH$_2$CH$_2$O)$_k$—H, wherein, e.g., k is about 10 to 30), then the region designated "SS" (i.e., 'soft segment') will be relatively flexible. Methods of selecting polyurethane precursors which will yield a polyurethane having hard and soft segments which confer a desired property (e.g., flexibility, elastomericity, etc.) to the polyurethane are well known in the art.

As illustrated in FIG. 1B, methods of making segmented polyurethanes are also known in the art. In these methods, one or more types of polyurethane precursors (OCN—P—NCO) are reacted with a chain extending compound (HZ—Y—ZH) to yield a segmented polyurethane. By varying the proportions of different types of polyurethane precursors, their end groups, the identity of the chain extender, and the like, the composition of polyurethane segments in the segmented polymer can be controlled, as is known in the art.

Medical grade segmented polyurethanes are usually prepared as depicted in FIGS. 1A and 1B, by condensing a diisocyanate with a polymeric diol having a molecular weight of about 1,000 to 3,000 (e.g., polytetramethyleneoxide for polyether-urethanes or polycarbonatediols for polycarbonate-urethanes) in order to form a polyurethane precursor which is subsequently reacted with an approximately equivalent amount of a chain extender (e.g., a diol such as 1,4-butanediol or a diamine such as a mixture of diaminocyclohexane isomers).

Polyurethanes can be used to form bulk polymers, coatings, fillings, and films. They are also readily machinable once set. The properties of polyurethanes have rendered them useful for medical and non-medical purposes, and they have been used for such purposes since at least the beginning of the twentieth century. Medical uses of polyurethanes have, however, been heretofore limited by the tendency of polyurethane products which contact the blood stream or other biological fluids to calcify, induce thrombogenesis, and/or chemically and mechanically deteriorate. It is believed that polyurethane deterioration results, at least in part, from chemical breakdown of the block-copolymer structure of the polyurethane molecule.

Prior art methods of improving polyurethane stability have relied primarily upon two approaches. One approach involves incorporation into the polyurethane backbone of chain extending compound having groups to which substituents can be added. For example, condensation of the di-hydroxy compound 1,2-di-hydroxy-1,2-bis (diethoxyphosphinyl)ethane with diisocyanates yields a polyurethane having reduced flammability and having esterified phosphonic groups attached to the polymer backbone, as described (Mikroyannidis, 1984, J. Polymer Sci., Polymer Chem. Ed. 22:891–903). These polymers have potential drawbacks when used in biomedical applications because of reduced reactivity of the di-hydroxy chain extending compounds, relative to standard chain-extenders such as 1,4-butanediol. Thus, the molecular weight and mechanical properties of polymers modified in this manner may preclude their medical use.

Chain extending compounds having quaternary ammonium and phosphorylcholine groups have been used to prepare polyurethanes for medical purposes (Baumgartner et al., 1996, ASAIO J. 42:M476–M479). However it does not appear to be possible to insert non-esterified phosphonic groups into polyurethanes using 1,2-diols having such groups, presumably because of the ability of phosphonic hydroxyl groups to react with isocyanates. At the same time, cleavage of phosphonic esters attached to the backbone of the polymer would result in simultaneous cleavage of urethane bonds.

The second approach to stabilizing polyurethanes is based on N-alkylation of urethane amine groups of the polyurethane chain. Contacting a polyurethane with an alkylating agent in the presence of a strong base results in alkylation of the urethane amine groups of the chain to yield additionally-substituted amine groups. It is believed that the strong base serves to extract protons from the urethane nitrogen. It has been demonstrated that moderate grades of metallation with sodium hydride at temperatures not significantly exceeding 0° C. do not induce significant polymer degradation (Adibi et al., 1979, Polymer 20:483–487). The polyanions remain soluble in aprotic solvents like dimethyl formamide and N,N-dimethylacetamide (DMA).

The first application of this N-alkylation method to medical grade polyurethanes involved N-alkylation of sodium hydride-activated polymer using alkyl iodides to attach $C_2$ to $C_{18}$ alkyl chains to the polymer backbone (Grasel et al., 1987, J. Biomed. Mat. Res. 21:815–842). It is believed that addition of such alkyl chains to polyurethanes improves the blood compatibility of the polymers. Grasel et al. pre-treated the polyurethane with sodium hydride at a temperature of from −5° C. to 0° C., and the reaction of the activated polymer with alkyl iodides was performed at a temperature of about 50° C. At this temperature, degradation of the polymer chain can occur. Further developments of such methods allowed substitution of the polymer chain with 3-carboxypropyl and 3-sulfonopropyl groups by activating the polyurethane chain using sodium hydride and then alkylating the chain using sodium salts of 4-iodobutyric acid or 1,3-propane sultone. Preparation of 3-carboxypropyl-modified polymers was complicated by the relatively low solubility of sodium 4-iodobutyrate in DMA. Another drawback to this method is that 4-iodobutyric acid, and alkyl iodides in general, are expensive and are not sufficiently stable in storage.

A need exists for methods of making improved polyurethane compositions which do not exhibit the utility-limiting effects exhibited by prior art polyurethanes. The present invention satisfies this need by providing polyurethane compositions which exhibit reduced thrombogenesis, reduced calcification, and greater resistance to chemical and mechanical deterioration.

BRIEF SUMMARY OF THE INVENTION

The invention relates to apolyurethane composition comprising a polyurethane having a geminal bisphosphonate substituent pendant therefrom (e.g., from a urethane nitrogen of the backbone of the polyurethane). The geminal bisphosphonate substituent can, for example, be a sulfur-containing substituent or a nitrogen-containing substituent. Examples of the geminal bisphosphonate include moieities having the structural formula

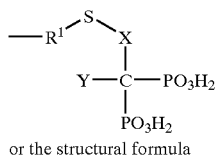

or the structural formula

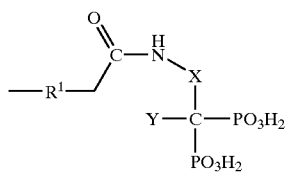

or an ionic form or salt of either of these, wherein $R^1$ an organic radical, wherein X is selected from the group consisting of a $C_1$ to $C_{18}$ alkylene, a $C_1$ to $C_{18}$ alkenylene, a $C_1$ to $C_{18}$ arylene, a $C_1$ to $C_{18}$ alkylene having one or more O, S, or N atoms incorporated into the alkylene chain, a $C_1$ to $C_{18}$ alkenylene having one or more O, S, or N atoms incorporated into the alkenylene chain, and a heterocyclic radical, and wherein Y is selected from the group consisting of hydrogen, hydroxyl, amino, $C_1$ to $C_{18}$ alkyl, $C_1$ to $C_{18}$ alkylamino, $C_1$ to $C_{18}$ alkoxy, $C_1$ to $C_{18}$ haloalkyl, $C_1$ to $C_{18}$ thioalkyl, $C_1$ to $C_{18}$ alkenyl, $C_1$ to $C_{18}$ aryl, $C_1$ to $C_{18}$ alkyl having one or more O, S, or N atoms incorporated into the alkylene chain, $C_1$ to $C_{18}$ alkenyl having one or more O, S, or N atoms incorporated into the alkenylene chain, and a heterocyclic compound.

$R^1$ can, for example, be selected from the group consisting of $C_2$ to $C_{18}$ alkyl (preferably $C_2$ to $C_6$ alkyl or $C_2$ to $C_4$ alkyl), $C_2$ to $C_{18}$ alkylamino, $C_2$ to $C_{18}$ alkox, $C_2$ to $C_{18}$ haloalkyl, $C_2$ to $C_{18}$ thioalkyl, $C_2$ to $C_{18}$ alkenyl, $C_2$ to $C_{18}$ aryl, $C_2$ to $C_{18}$ alkyl having one or more O, S, or N atoms incorporated into the alkylene chain, $C_2$ to $C_{18}$ alkenyl having one or more O, S, or N atoms incorporated into the alkenylene chain, and a heterocyclic compound.

In one aspect, the polyurethane comprises at least about 10 micromoles of the geminal bisphosphonate substituent per gram of the polyurethane, such as a polyurethane wherein the geminal bisphosphonate substituent is pendant from at least about 0.5 to 40% of the urethane nitrogens of the backbone of the polyurethane.

Also included in the invention are polyurethane compositions, wherein the polyurethane has at least two different geminal bisphosphonate substituents pendant therefrom.

In another polyurethane composition of the invention, the polyurethane has both a geminal bisphosphonate substituent and a cationic substituent (e.g. a thioalkylamine moiety) pendant therefrom. When the cationic substituent is a thioalkylamine moiety, it can, for example, be a quaternary amine moiety or a moiety having the structural formula

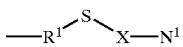

wherein $R^1$ an organic radical, wherein X is selected from the group consisting of a $C_1$ to $C_{18}$ alkylene, a $C_1$ to $C_{18}$ alkenylene, a $C_1$ to $C_{18}$ arylene, a $C_1$ to $C_{18}$ alkylene having one or more O, S, or N atoms incorporated into the alkylene chain, a $C_1$ to $C_{18}$ alkenylene having one or more O, S, or N atoms incorporated into the alkenylene chain, and a heterocyclic radical, and wherein $N_1$ is selected from the group consisting of —$NH_3$, a primary organic amine moiety, a secondary organic amine moiety, and a tertiary organic amine moiety.

The invention further includes polyurethane composition as described herein, wherein the polyurethane is blended with a non-polyurethane polymer, and foams or implantable devices comprising a polyurethane composition described herein.

In another aspect, the invention relates to a method of making a geminal bisphosphonate-derivatized polyurethane. This method comprises i) grafting a 1,ω-dibromoalkyl compound (e.g., a $C_2$–$C_6$ 1,ω-dibromoalkyl compound) with a urethane amino moiety of a polyurethane to form an ω-bromoalkyl-substituted polyurethane and ii) grafting a geminal bisphosphonate thiol with the ω-bromoalkyl-substituted polyurethane to form the geminal bisphosphonate-derivatized polyurethane. One advantage of this synthetic method is that it can be performed at a reasonable rate at a temperature lower than about 40 degrees Celsius. The method can be modified such that it further comprises grafting a thioalkylamine with the ω-bromoalkyl-substituted polyurethane, in order to yield a derivatized polyurethane having both geminal bisphosphonate substituents and cationic substituents pending from its backbone.

Another method of making a geminal bisphosphonate-derivatized polyurethane comprises i) grafting a ω-bromocarboxylic acid (e.g., a $C_2$–$C_6$ ω-bromocarboxylic acid) with a urethane amino moiety of a polyurethane to form an ω-carboxyalkyl-substituted polyurethane and ii) grafting a geminal bisphosphonate amine with the ω-carboxyalkyl-substituted polyurethane to form the geminal bisphosphonate-derivatized polyurethane. This method can also be performed at a temperature lower than about 40 degrees Celsius, and can, like the method mentioned in the preceding paragraph, be modified such that it further comprises grafting a thioalkylamine with the ω-carboxyalkyl-substituted polyurethane, in order to yield a derivatized polyurethane having both geminal bisphosphonate substituents and cationic substituents pending from its backbone.

In a hybrid method of making a geminal bisphosphonate-derivatized polyurethane i) a 1,ω-dibromoalkyl compound is grafted with a urethane amino moiety of a polyurethane to form an ω-bromoalkyl-substituted polyurethane;

ii) the ω-bromoalkyl-substituted polyurethane is contacted with an ω-thiocarboxylic acid to form an ω-carboxyl-thioalkyl-substituted polyurethane; and iii) the ω-carboxyl-thioalkyl-substituted polyurethane is grafted with a geminal bisphosphonate amine in order to form the geminal bisphosphonate-derivatized polyurethane.

The invention includes still another method of making a geminal bisphosphonate-derivatized polyurethane. This method comprises i) grafting a bromo-epoxyalkyl compound (e.g., a $C_3$–$C_6$ bromo-epoxyalkyl compound) with a urethane amino moiety of a polyurethane to form an bromo-epoxyalkyl-substituted polyurethane and ii) grafting a geminal bisphosphonate thiol with the bromo-epoxyalkyl-substituted polyurethane to form the geminal bisphosphonate-derivatized polyurethane. Like the methods mentioned above, this method can be performed at a reasonable rate at a temperature lower than about 40 degrees Celsius, and can be modified such that it further comprises grafting a thioalkylamine with the bromo-epoxyalkyl-substituted polyurethane, in order to yield a derivatized polyurethane having both geminal bisphosphonate substituents and cationic substituents pending from its backbone.

In still another aspect, the invention relates to a method of preparing a polyurethane derivative. This method comprises contacting a polyurethane with a bi-functional linker reagent in the presence of an aprotic solvent and a strong base to form an activated polyurethane derivative. The bi-functional linker reagent has a bromine substituent and a second functional group, and can, for example, be selected from the group consisting of a dibromoalkyl compound, a bromo-carboxyalkyl compound, and a bromo-epoxyalkyl compound. Examples of such bi-functional linker reagents include 1,6-dibromohexane, 1,4-dibromobutane, ω-bromobutanoic acid, ω-bromohexanoic acid, ω-bromoundecanoic acid, and bromoalkyl oxirane compounds. The second functional group can, for example, be a geminal bisphosphonate group.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1, comprising In FIG. 1A, "T" refers to a terminal group (e.g., either —H or —CO—NH—A—NCO).

FIG. 4, comprising

DETAILED DESCRIPTION OF THE INVENTION

Figure 1A:
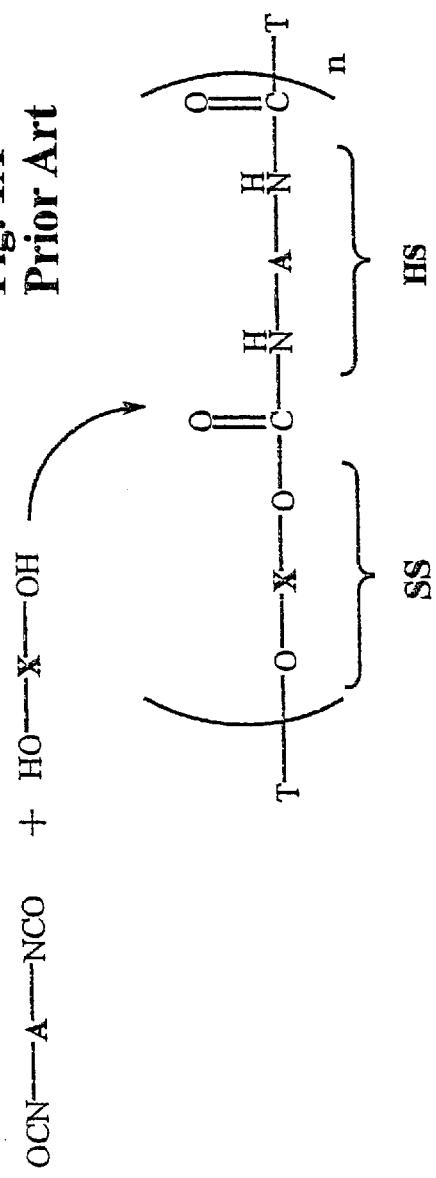
FIGS. 1A and 1B, is a pair of reaction schemes for generating a polyurethane (FIG. 1A) and a segmented polyurethane (FIG. 1B).

The present invention is based on the discovery of a new, low temperature (i.e., less than 40° C., less than 30° C., less than 15° C., and preferably less than 5° C., but preferably not less than −20° C.) method for preparing polyurethane derivatives which are amenable to further derivatization using, for example, anti-calcification, anti-coagulant, and stabilizing agents. This method has the advantages that a high percentage (i.e., at least about 1%, and preferably at least about 2% of the urethane amine groups of the polyurethane chain) can be modified, and that the temperature during the reaction mixture can be maintained sufficiently low to avoid significant degradation of polyurethane chains. Furthermore, the derivatization reagent used in the method of the invention can be selected to have more than one functional group, leading to formation of polyurethane derivatives having functional groups (e.g., bromo- or carboxyl-groups) with which additional derivatization reagents may be reacted. This facilitates preparation of specialized polyurethane derivatives which exhibit less calcification, thrombogenesis, and mechanical and chemical degradation when used for medical purposes.

The invention thus includes methods of making improved polyurethane derivatives, polyurethane derivatives made using such methods, devices comprising such derivatives, and particular derivatized polyurethanes described herein.

Definitions

As used herein, each of the following terms has the meaning associated with it in this section.

The articles "a" and "an" are used herein to refer to one or to more than one (i.e., to at least, one)of the grammatical object of the article. By way of example, "an element" means one element or more than one element.

A "polyurethane" is a polymer which comprises repeating units having a urethane group in the polymer backbone. Such polymers include, for example, polyurethane homopolymers, block co-polymers comprising at least one polyurethane block, and polymer blends comprising such homopolymers and block co-polymers.

A "urethane group" is a chemical structure which is part of the backbone of a polymer and which has the following formula, wherein the wavy lines represent the rest of the backbone.

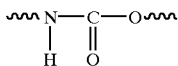

The "backbone" of a polymer is the collection of atoms and chemical bonds therebetween which link the repeating units of the polymer to one another.

A chemical substituent is "pendant" from the backbone of a polymer if it is attached to an atom of a monomeric unit of the polymer.

A "stabilizing agent" is a chemical compound which, when pendant from the backbone of a polyurethane or added to a composition comprising a polyurethane, decreases at least one of the following properties of the polyurethane, relative to the same polyurethane or composition which does not comprise the agent:

the tendency of the polyurethane to become calcified in vivo;

the tendency of the polyurethane to induce thrombogenesis when contacted with human blood;

the tendency of the polyurethane to chemically degrade; and the tendency of the polyurethane to mechanically degrade.

A "geminal bisphosphonate" compound is a compound having two phosphonate groups bound, via their respective phosphorus atoms, to a single carbon atom of the compound.

A "heparin" is any of the well-known class of sulfated glycosaminoglycans, including heparan sulfate, among others.

An "antioxidant" is a chemical compound (e.g., vitamin E) which inhibits or reduces oxidative damage to a polyurethane when attached thereto.

A composition is "grafted" to a polymer when it is covalently bound thereto.

An "implantable" device is one which is adapted for permanent or temporary insertion into or application against a tissue of an animal such as a human.

A "foam" is a polymeric composition having gas- or liquid-filled cells within the bulk thereof. As used herein, foams include both "open cell" foams, in which passages exist among the cells and the exterior of the foam, and "closed cell" foams, in which some or all of the cells are isolated from all other cells and from the exterior of the foam.

Description

The method of the invention for preparing a polyurethane derivative that is amenable to further derivatization comprises contacting a polyurethane with a multi-functional linker reagent in the presence of an aprotic solvent an a strong base to form the polyurethane derivative. The linker can be a bi-functional linker (e.g., as with one of the linkers described herein in the Examples), a tri-functional linker, a quadri-functional linker, and the like. The derivative is herein referred to as an 'activated' polyurethane derivative, because it is amenable to further derivatization. This is so because the multi-functional linker reagent has a bromine substituent and at least a second functional group. Additional groups (e.g., geminal bisphosphonate compounds, heparins, or anti-oxidants) can be added to the polymer by reacting the groups with this second functional group.

It has been found that the bromine substituent of the multi-functional linker is surprisingly reactive with polyanionic polyurethane generated by maintaining polyurethane in the presence of a strong base in an aprotic solvent at a temperature less than 50° C., less than 40° C., less than 30° C., less than 15° C., or even less than 5° C. (especially when the multi-functional linker is a 1,ω-dibromoalkyl compound).

The chemical identity of the multi-functional linker is not critical, except that it must have at least one bromine substituent and at least one other functional group (which can, for example, be another bromine substituent, a carboxyl substituent, a sulfonate ester substituent, or the like). The multi-functional linker is preferably an organic compound, and the bromine substituent and the second functional group are preferably attached to different carbon atoms of the linker. The multi-functional linker can be represented by the following general formula:

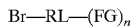

wherein

Br is bromine;

n is an integer from 1 to 3 or more (preferably an integer from 1 to 3);

each FG is, independently, a functional group such as a halogen (not necessarily Br), a carboxyl group, a sulfonate ester (e.g., a mesylate $\{CH_3SO_2O-\}$, triflate $\{CF_3SO_2O-\}$, or tosylate substituent), or an epoxy ring (e.g., an oxirane ring); and $R_L$ is an (n+1)-valent organic radical comprising at least one carbon atom. $R_L$ can, for example, be a $C_1$ to $C_{18}$ straight or branched chain alkylene group (e.g., methylene, ethylene, hexylene, $-(CH_2)_{10}-$ etc.), a compound having two or more alkylene regions having a cycloalkane group, a cycloaryl group, or a heterocyclic group interposed therebetween. When FG is a halogen or sulfonate ester group, any carbon atom to which it can be attached is preferably an aliphatic carbon. However, when FG is an epoxy ring, any carbon atom to which it is attached can be aliphatic, unsaturated, or aromatic. In one embodiment, $R_L$ is a methylene group, n is 1 and FG is an epoxide ring (i.e., the linker is epibromohydrin, which has the following structure).

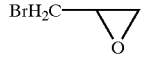

In a preferred embodiment of the method of the invention, the multi-functional linker reagent is a dibromoalkyl compound, a bromo-carboxyalkyl compound, or a bromo-epoxyalkyl compound. Particularly preferred dibromoalkyl compounds include 1,ω-dibromoalkyl compounds such as 1,6-dibromohexane (e.g., as exemplified in Example 1), 1,4-dibromobutane (e.g., as exemplified in Example 14), and substituted 1,ω-dibromoalkyl compounds. Particularly preferred bromo-carboxyalkyl compounds include ω-bromocarboxylic acids such as ω-bromohexanoic acid and ω-bromoundecanoic acid (e.g., as exemplified in Example 2) and substituted ω-bromocarboxylic acids. Particularly preferred bromo-epoxyalkyl compounds include bromo-oxiranealkyl compounds such as epibromohydrin (e.g., as exemplified in Example 3).

It is recognized that dibromoalkyl compounds having relatively short alkyl chain lengths (e.g., dibromo—$C_2$, —$C_3$, —$C_4$, —$C_5$, and —$C_6$ compounds), and presumably bromo-carboxyalkyl and bromo-epoxyalkyl compounds having relatively short alkyl chain lengths, can exhibit greater reactivity with urethane anionic moieties. Owing to this enhanced reactivity, a less strong base (e.g., lithium tert-butoxide) can be used, with the advantage that base-mediated degradation of the polyurethane can be reduced.

In another preferred embodiment, at least one functional group is a sulfonate ester. Thus, in this embodiment, the multi-functional linker reagent can, for example, be ω-bromoalkyl sulfonate esters such as ω-bromoalkyl mesylates (i.e., $CH_3SO_2O(CH_2)_qBr$, wherein q is an integer equal to or greater than 1), ω-bromoalkyl triflates (i.e., $CF3SO_2O(CH_2)_qBr$), and ω-bromoalkyl tosylates.

The polyurethane which is derivatized according to the method of the invention can be substantially any polyurethane which has at least one urethane nitrogen in its backbone.

The aprotic solvent can be substantially any aprotic solvent. Use of N,N-dimethylacetamide is exemplified herein, butt is understood that a wide variety of other aprotic solvents can be used in place thereof, including, for example, N,N-dimethyl formamide, 1-methyl-2-pyrrolidinone, tetrahydrofuran, dioxane, and dimethyl sulfoxide (DMSO).

The strong base can likewise be substantially any strong base that is soluble in the aprotic solvent used. Exemplary strong bases include sodium hydride, lithium diisopropylamide, sodium or potassium tert-butoxide, dimsyl sodium, lithium hydride, sodium amide, lithium N,N-dicyclohexylamide, and other lithium N,N-dialkylamides. It is important to consider the effect that a counter-ion of the base may have upon the multi-functional linker, the derivatized polyurethane, or both. It is important that the multi-functional linker not be precipitated from solution, since this would complicate reaction of the linker with the polyurethane. Similarly, if it is desired that the derivatized polymer should remain in solution, a base should be chosen which does not have a counter-ion which would precipitate the derivatized polymer. For example, if the multi-functional linker comprises one or more carboxyl groups and several methylene groups, it can be preferably to avoid strong bases which have sodium counter-ions. The same base having lithium counter-ions can be preferable. As noted above, when a multi-functional linker having a relatively high reactivity with polyurethane anionic moieties is used, the strength of the base can be lower than when a multi-functional linker having a lower reactivity is used. Thus, for example, it can be advisable to use a base such as lithium diisopropylamide when the linker is 1,6-dibromohexane; it can be advisable to use a relatively less strong base (e.g., lithium tert-butoxide) when the linker is more reactive (e.g., 1,4-dibromobutane).

The method of the invention is now discussed in greater detail with regard to three particular types of multi-functional linkers (i.e., 1,ω-dibromoalkyl compounds, ω-bromocarboxylic acids, and bromo-epoxyalkyl compounds) in order to more thoroughly describe what the inventors regard as the invention. It is understood that the method of the invention is not limited to the particular linkers exemplified.

Synthesis of ω-Bromoalkylated Polyurethane

Figure 2:
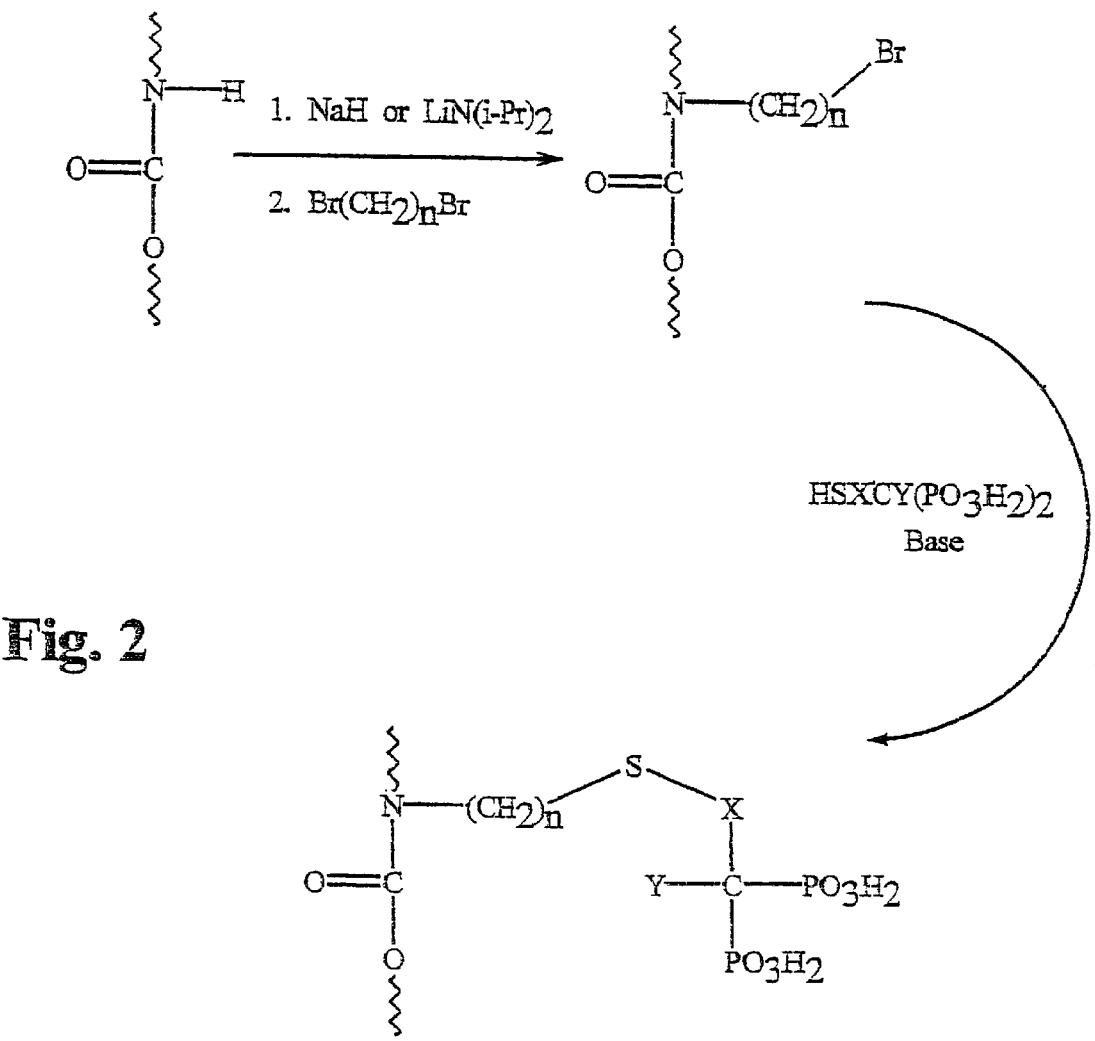
FIG. 2 is a reaction scheme described herein for derivatization of a polyurethane using a 1,ω-dibromoalkane and a geminal bisphosphonate thiol. In this Figure, n can, for example be 2 to 18, and X and Y are as described in the text. The wavy lines represent the polyurethane backbone.

According to this method, which is illustrated in exemplary form in FIG. 2, a polyurethane is dissolved or suspended in an-aprotic solvent and treated with a strong base in order to withdraw protons from one or more of the urethane amino moieties of the polyurethane backbone. This treatment causes the polyurethane backbone to become polyanionic. It is believed that the nucleophilicity of the ionized nitrogen atoms of the polyurethane backbone is thereby enhanced.

Combining the polyanionic polyurethane with an excess of a 1,ω-dibromoalkyl compound, such as a 1,ω-dibromoalkane, results in attachment of ω-bromoalkyl groups to nitrogen atoms of the polyurethane backbone. The strength of the base that is needed can be reduced if the reactivity of the 1,ω-dibromoalkyl compound with polyurethane anionic groups is enhanced (e.g., by selecting a compound having a relatively short alkyl chain length).

Derivatization of ω-Bromoalkylated Polyurethanes

Various stabilizing agents can be attached to an activated polyurethane derivative of the invention which has been made using a 1,ω-dibromoalkane linker. Such agents include, for example, geminal bisphosphonate compounds, heparins, and anti-oxidants. When the linker used to make the activated derivative was a 1,ω-dibromoalkane, it is preferred that the geminal bisphosphonate compound is a geminal bisphosphonate thiol. Preferably, the reaction between the ω-bromoalkylated polyurethane and the geminal bisphosphonate thiol is performed in the presence of a proton scavenger that is not susceptible to alkylation (e.g., a sterically-hindered tertiary amine, a tetraalkylammonium hydroxide or a tetraalkylammonium salt of a week acid, such as a tetraalkylammonium borate). The proton scavenger binds hydrogen bromide formed by the reaction, thereby maintaining basic reaction conditions. The identity of the geminal bisphosphonate thiol is not critical, except that it should be selected such that the desired group is added to the activated polyurethane derivative. By way of example, the geminal bisphosphonate thiol can be one having the structural formula

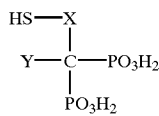

or an ionic form or salt thereof, wherein

X is selected from the group consisting of $C_1$ to $C_{18}$ alkylene, $C_1$ to $C_{18}$ alkenylene, $C_1$ to $C_{18}$ arylene, $C_1$ to $C_{18}$ alkylene having one or more O, S, or N atoms incorporated into the alkylene chain (e.g., —$CH_2CH_2CH_2SCH_2$—), $C_1$ to $C_{18}$ alkenylene having one or more O, S, or N atoms incorporated into the alkenylene chain, and a heterocyclic radical, and Y is selected from the group consisting of hydrogen, hydroxyl, amino, $C_1$ to $C_{18}$ alkyl, $C_1$ to $C_{18}$ alkylamino, $C_1$ to $C_{18}$ alkoxy, $C_1$ to $C_{18}$ haloalkyl, $C_1$ to $C_{18}$ thioalkyl, $C_1$ to $C_{18}$ alkenyl, $C_1$ to $C_{18}$ aryl, $C_1$ to $C_{18}$ alkyl having one or more O, S, or N atoms incorporated into the alkylene chain (e.g., —$CH_2CH_2CH_2SCH_3$), $C_1$ to $C_{18}$ alkenyl having one or more O, S, or N atoms incorporated into the alkenylene chain, and a heterocyclic substituent.

Exemplary compounds of this type include a compound wherein X is methylene and Y is hydrogen (i.e., 2-mercaptoethylidene-1,1-bisphosphonic acid) and a compound in which X is —$(CH_2)_3$—S—$CH_2$— and Y is hydrogen (i.e., 2-(3-mercaptopropylthio)-ethylidene-1,1-bisphosphonic acid).

Synthesis of ω-Carboxyalkylated Polyurethane

Figure 3:
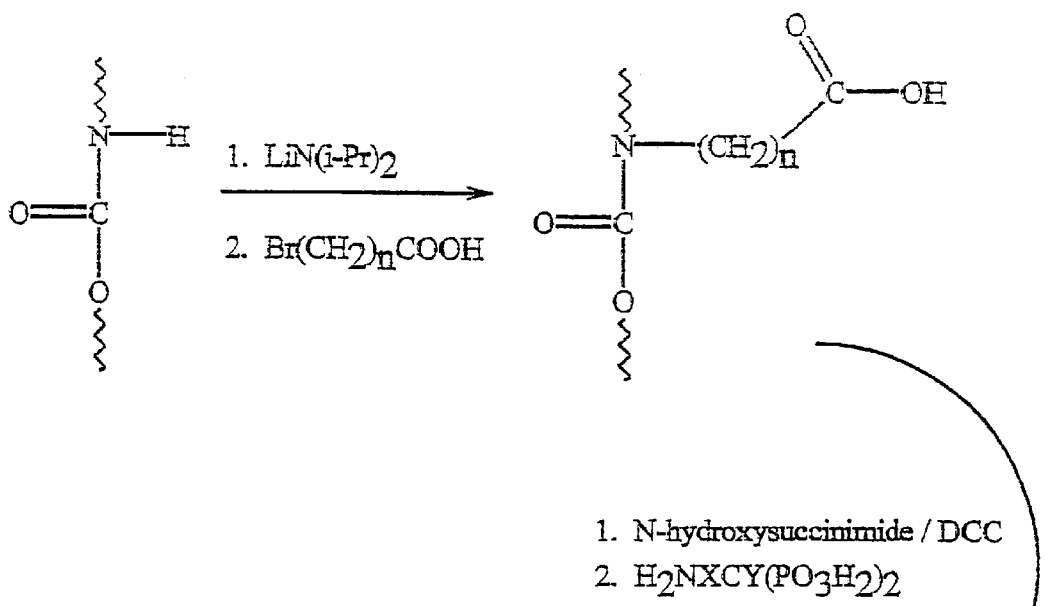
FIG. 3 is a reaction scheme described herein for derivatization of a polyurethane using an ω-bromocarboxylic acid and a geminal bisphosphonate amine. In this Figure, n can, for example be 2 to 18, and X and Y are as described in the text. The wavy lines represent the polyurethane backbone.
Figure 3:
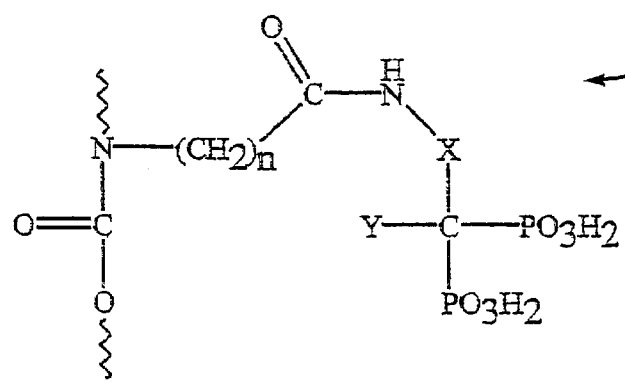

According to this method, which is illustrated in exemplary form in FIG. 3, polyurethane is dissolved or suspended in an aprotic solvent and treated with a strong base in order to withdraw protons from one or more of the urethane amino moieties of the polyurethane backbone. This treatment causes the polyurethane backbone to become polyanionic. It is believed that the nucleophilicity of the ionized nitrogen atoms of the polyurethane backbone is thereby enhanced. In contrast to the ω-bromoalkylation method described herein, it is preferred that the strong base be a potassium-containing or, preferably, a lithium-containing base (e.g., lithium diisopropylamide), in order to avoid decreasing the solubility of the acidic ω-bromocarboxylic acid in the solvent. Thus, where salts of the acid are used, they should also be potassium or, preferably, lithium salts.

Combining the polyanionic polyurethane with an excess of an ω-bromocarboxylic acid, such as ω-bromohexanoic acid or ω-bromoundecanoic acid, results in attachment of ω-carboxyalkyl groups to nitrogen atoms of the activated polyurethane backbone.

Carboxyalkylated polyurethanes can also be generated by derivatizing a polyurethane using a 1,ω-dibromoalkyl compound to yield an ω-bromoalkyl derivatized polyurethane and then reacting that compound with a compound comprising a carboxyl group and a group capable of displacing the (o-bromo group and binding with the alkyl group of the ω-bromoalkyl substituent, thus yielding a carboxyalkyl-derivatized polyurethane. For example an ω-bromoalkyl$^1$ derivatized polyurethane can be reacted with a 1-thio-ω-carboxyalkyl$^2$ compound to yield a carboxyalkyl$^2$-S-alkyl$^1$-derivatized polyurethane.

Derivatization of Bromoalkylated and Carboxyalkylated Polyurethanes

Carboxylate groups linked to the activated polymer can be activated by formation of esters in the presence of a suitable carbodiimide. Such esters include, for example, N-hydroxysuccinimide esters, N-hydroxymaleimide esters, and N-hydroxyphthalimide esters. For example, dicyclohexylcarbodiimide is preferred, owing to its good solubility in most organic solvents. Following activation of the carboxylate groups, the carbodiimide and N-hydroxysuccinimide (or other ester precursor) are removed from the reaction mixture (e.g., by rinsing the polymer with solvent not containing these compounds).

A stabilizing agent having at least one group (e.g., an amine group) which is capable of forming a bond with the activated carboxyl group is then contacted with the polymer, resulting in attachment of the agent to the polymer. When the stabilizing agent is a geminal bisphosphonate, it is preferred that the agent be a geminal bisphosphonate amine. The identity of the geminal bisphosphonate amine, and can, for example, have the chemical formula

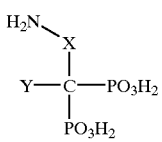

or an ionic form or salt thereof,

X is selected from the group consisting of $C_1$ to $C_{18}$ alkylene, $C_1$ to $C_{18}$ alkenylene, $C_1$ to $C_{18}$ arylene, $C_1$ to $C_{18}$ alkylene having one or more O, S, or N atoms incorporated into the alkylene chain (e.g., —$CH_2CH_2CH_2SCH_2$—), $C_1$ to C18 alkenylene having one or more O, S, or N atoms incorporated into the alkenylene chain, and a heterocyclic radical, and Y is selected from the group consisting of hydrogen, hydroxyl, amino, $C_1$ to $C_{18}$ alkyl, $C_1$ to $C_{18}$ alkylamino, $C_1$ to $C_{18}$ alkoxy, $C_1$ to $C_{18}$ haloalkyl, $C_1$ to $C_{18}$ thioalkyl, $C_1$ to $C_{18}$ alkenyl, $C_1$ to $C_{18}$ aryl, $C_1$ to $C_{18}$ alkyl having one or more O, S, or N atoms incorporated into the alkylene chain (e.g., —$CH_2CH_2CH_2SCH_3$), $C_1$ to $C_{18}$ alkenyl having one or more O, S, or N atoms incorporated into the alkenylene chain, and a heterocyclic substituent.

Y is preferably not amino. A particular example of a suitable geminal bisphosphonate amine is one in which X is ethylene and Y is hydroxyl (i.e., 3-amino-1-hydroxypropylidene-1,1-bisphosphonic acid; pamidronic acid). If the geminal bisphosphonate amine is not soluble in the solvent in which the polymer is dissolved, a soluble salt form of the amine can used (e.g., a mono-tetrabutylammonium salt).

Derivatization of Epoxyalkylated Polyurethanes

Numerous compounds capable of opening epoxide rings are known in the art, and any of these compounds can be used to further derivatize the epoxyalkylated polyurethanes described herein. Preferably, the compound used to open the epoxide ring (and further derivatize the polymer) has a bisphosphonate group. By way of example, compounds having both a thiol substituent (for opening the epoxide ring and binding with a carbon atom thereof) and a bisphosphonate group can be used. Such compounds include compound I and compound II, as described elsewhere herein. It is furthermore recognized that, under appropriate reaction conditions (e.g., maintenance for several days at 40 to 70° C.), other bisphosphonate compounds such as amino-bisphosphonates (e.g., pamidronate mono-tetrabutyl ammonium salt in the presence of N,N-diisopropylethylamine) and hydroxy bisphosphonates (e.g., $H_3C$—$COH$—$\{PO_3H_2\}_2$) can be used to open an epoxide ring pendant from a polyurethane. Thiol bisphosphonate compounds (e.g., compounds I and II) have the dual advantage that they open the epoxide ring under relatively gentle reaction conditions (e.g., maintenance at 0° C. for 5 to 15 minutes) and substantially eliminate formation of phosphonate monoesters generated by opening of the epoxide ring by a bisphosphonate group.

Geminal Bisphosphonate-derivatized Polyurethane Derivatives

The invention includes a number of polyurethane derivatives, including those made by the methods of the invention. In addition, however, the inventors have discovered that polyurethane derivatives having a geminal bisphosphonate substituent pendant therefrom exhibit outstanding properties in medical uses. In particular, geminal bisphosphonate-derivatized polyurethanes exhibit excellent anti-calcification properties, which is significant, given the tendency of polyurethanes to calcify when used in contact with biological fluids.

The invention therefore includes a polyurethane composition, comprising a polyurethane having a germinal bisphosphonate substituent pendant therefrom. Preferably, the geminal bisphosphonate substituent is pendant from a urethane nitrogen of the backbone of the polyurethane.

The geminal bisphosphonate substituent can, for example, be a sulfur-containing substituent or a nitrogen-containing substituent. For example, when the geminal bisphosphonate substituent is a sulfur-containing substituent, it can have the structural formula

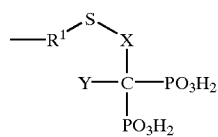

or an ionic form or salt thereof, wherein $R^1$ an organic radical, such as one of a $C_1$ to $C_{18}$ (preferably $C_2$ to $C_{18}$) straight or branched chain alkylene (e.g., methylene, ethylene, hexylene, —$(CH_2)_{10}$— etc.), alkylamino, alkoxy, haloalkyl, thioalkyl, alkenyl, alkyl (having one or more O, S, or N atoms incorporated into the alkylene chain), alkenyl (having one or more O, S, or N atoms incorporated into the alkenylene chain), and a radical having two alkylene regions with a cycloalkyl, cycloaryl, or heterocyclic group interposed therebetween, X is selected from the group consisting of $C_1$ to $C_{18}$ alkylene, $C_1$ to $C_{18}$ alkenylene, $C_1$ to $C_{18}$ arylene, $C_1$ to $C_{18}$ alkylene having one or more O, S, or N atoms incorporated into the alkylene chain (e.g., —$CH_2CH_2CH_2SCH_2$—), $C_1$ to $C_{18}$ alkenylene having one or more O, S, or N atoms incorporated into the alkenylene chain, a heterocyclic radical, and Y is selected from the group consisting of hydrogen, hydroxyl, amino, $C_1$ to $C_{18}$ alkyl, $C_1$ to $C_{18}$ alkylamino, $C_1$ to $C_{18}$ alkoxy, $C_1$ to $C_{18}$ haloalkyl, $C_1$ to $C_{18}$ thioalkyl, $C_1$ to $C_{18}$ alkenyl, $C_1$ to $C_{18}$ aryl, $C_1$ to $C_{18}$ alkyl having one or more O, S, or N atoms incorporated into the alkylene chain (e.g., —$CH_2CH_2CH_2SCH_3$), $C_1$ to $C_{18}$ alkenyl having one or more O, S, or N atoms incorporated into the alkenylene chain, and a heterocyclic compound.

When the geminal bisphosphonate substituent is a nitrogen-containing substituent, it can, for example, have the structural formula

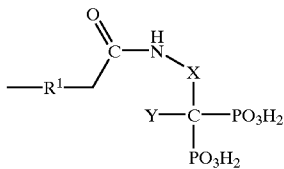

or an ionic form or salt thereof, wherein $R^1$, X, and Y are as described above.

The geminal bisphosphonate-derivatized polyurethanes of the invention are characterized in that at least one and preferably about 0.5 to 40% of the urethane nitrogens (more preferably 1 to 20% or 5 to 10% of the urethane nitrogens) of the backbone of the polyurethane have a geminal bisphosphonate substituent pendant therefrom. Alternatively expressed, the geminal bisphosphonate-derivatized polyurethanes of the invention are characterized in that the polyurethanes comprise about 10 to 400 (more preferably 20 to 200) micromoles of the substituent per gram of polyurethane. The polyurethane can comprise geminal bisphosphonate substituents of only a single type, or it can comprise more than one type of geminal bisphosphonate substituent.

The geminal bisphosphonate-derivatized polyurethane of the invention can be a homopolymer, a block co-polymer comprising at least one block of geminal bisphosphonate-derivatized polyurethane, or a blend of such a homopolymer or block co-polymer with another polymer.

The geminal bisphosphonate-derivatized polyurethane of the invention exhibits decreased calcification in vivo, and is therefore useful for making implantable devices. The device can be entirely or partially made from the polyurethane of the invention, coated with the polyurethane, impregnated with the polyurethane, and the like. The polyurethane of the invention can be present as a bulk polymer, a film, as a particulate, or as a foam, for example.

Implantable devices which can be made using the polyurethane of the invention include, but are not limited to, degradable and non-degradable sutures, orthopedic protheses such as supporting rod implants, joint protheses, pins for stabilizing fractures, bone cements and ceramics, tendon reconstruction implants, prosthetic implants, cardiovascular implants such as heart valve prostheses, pacemaker components, defibrillator components, angioplasty devices, intravascular stents, acute and in-dwelling catheters, ductus arteriosus closure devices, implants deliverable by cardiac catheters such as atrial and ventricular septal defect closure devices, urologic implants such as urinary catheters and stents, neurosurgical implants such as neurosurgical shunts, ophthalmologic implants such as lens prosthesis, thin ophthalmic sutures, and corneal implants, dental prostheses, internal and external wound dressings such as bandages and hernia repair meshes, and other implantable devices, as will be readily apparent to the skilled artisan.

Bisphosphonate-/Cationic Moiety-derivatized Polyurethane Derivatives

The invention further includes polyurethane derivatives which have both geminal bisphosphonate substituents and cationic substituents pendant therefrom. Such polyurethane derivatives can exhibit improved stability, water retention, and anti-calcification properties, relative to non-derivatized polyurethanes or to geminal bisphosphonate-derivatized polyurethanes. In addition, side effects associated with implantation of such geminal bisphosphonate-/cationic moiety-derivatized polyurethanes can be less significant than the side effects associated with implantation of geminal bisphosphonate-derivatized polyurethanes or non-derivatized polyurethanes.

When a polyurethane is derivatized with a bisphosphonate moiety, the polyurethane exhibits a negative charge at physiological pH, and can be associated with cations which neutralize this charge. As noted above, geminal bisphosphonate-derivatized polyurethanes can exhibit relatively low solubility in the solvents in which they are prepared or processed (e.g., in solvents such as DMA during film casting using the polyurethane) in the presence of physiologically relevant cations such as sodium ions.

Counter-ions which enhance the solubility of geminal bisphosphonate-derivatized polyurethanes in the solvents in which they can be synthesized (e.g., tetrabutylammonium ions) can lend undesirable properties to the polyurethane. For instance, organic cations (e.g., tetrabutylammonium ions) associated with the polyurethane can inhibit the rate, the extent, or both, of water uptake by the polyurethane, thereby rendering the polyurethane less stable upon implantation than it would be if it exhibited faster or more extensive water uptake. Thus, it can be advantageous to remove organic (or other hydrophobic) cations from geminal bisphosphonate-derivatized polyurethanes, particularly when the polyurethane is to be incorporated into, or used to form, all or part of a device which is to be implanted into the body of an animal (e.g., a device for implantation into a human). Such cations can be removed from the polyurethane by substituting physiologically relevant cations (i.e., cations that are normally present in at least micromolar concentration in the human body, such as $Na^+$ or $K^+$) in place of the organic/hydrophobic cations.

Cation exchange can be achieved by maintaining a polyurethane comprising organic or other hydrophobic cations in contact with a solution containing a physiologically relevant cation (e.g., a buffer comprising sodium or potassium ions). However, because organic and hydrophobic cations can exhibit very low solubility in aqueous solutions, this method of cation exchange can be very slow, and may not achieve a desirable degree of cation exchange (e.g., leading to separation of the polyurethane coating from its substrate).

Another method of cation exchange involves use of a solvent (e.g., ethanol) in which physiologically relevant cations exhibit at least limited solubility, and in which organic or other hydrophobic cations present in the polyurethane also exhibit solubility greater than their aqueous solubility. In certain embodiments (e.g., when the polyurethane is to be used to coat an implantable device such as a heart valve), this cation exchange method can be undesirable, since the use of non-aqueous solvents can lead to unacceptable swelling or other distortion of the polyurethane.

The inventors have discovered a method of synthesizing geminal bisphosphonate-derivatized polymers which reduces or eliminates the need for cation exchange. In this method, the polyurethane is substituted with one or more geminal bisphosphonate moieties, as described above. In addition, the polyurethane is also derivatized with one or more types of cationic moiety, such that the finished polyurethane comprises both geminal bisphosphonate moieties pendant from the polyurethane backbone and cationic moieties pendant from the polyurethane backbone. The timing of the two derivatization procedures is not critical. The polyurethane can be derivatized with the geminal bisphosphonate moieties before, after, or during derivatization with the cationic moiety(ies).

The precise nature and structure of the cationic moieties which are attached to the polyurethane is not critical. The moieties can have a permanent charge (e.g., quaternary ammonium group-containing moieties), or they can have a structure which is charged only below certain pH values (e.g., ternary, binary, or primary amine group-containing moieties). Derivatization of polyurethane with amine (quaternary, ternary, binary, or primary) moieties is preferred, although other cationic moieties can be used. When a permanently charged cationic moiety is used, the polyurethane is preferably derivatized therewith such that the net positive charge imparted to the polyurethane by the cationic moieties is approximately equal to the net negative charge imparted to the polyurethane by bisphosphonate moieties, at a pH that is convenient for synthesis, cation exchange, or implantation of the polyurethane. A pH value convenient for implantation is physiological pH. pH values that are convenient for synthesis or cation exchange are preferably pH values at which insignificant (or no) degradation of the polyurethane occurs during the time frame of the synthesis or exchange. For example, the ratio of bisphosphonate moities:cationic moieties can be from 1:1 to 1:5, and is preferably 1:2 (i.e., at which ratio the net charge on the polymer is about zero).

Figure 6:
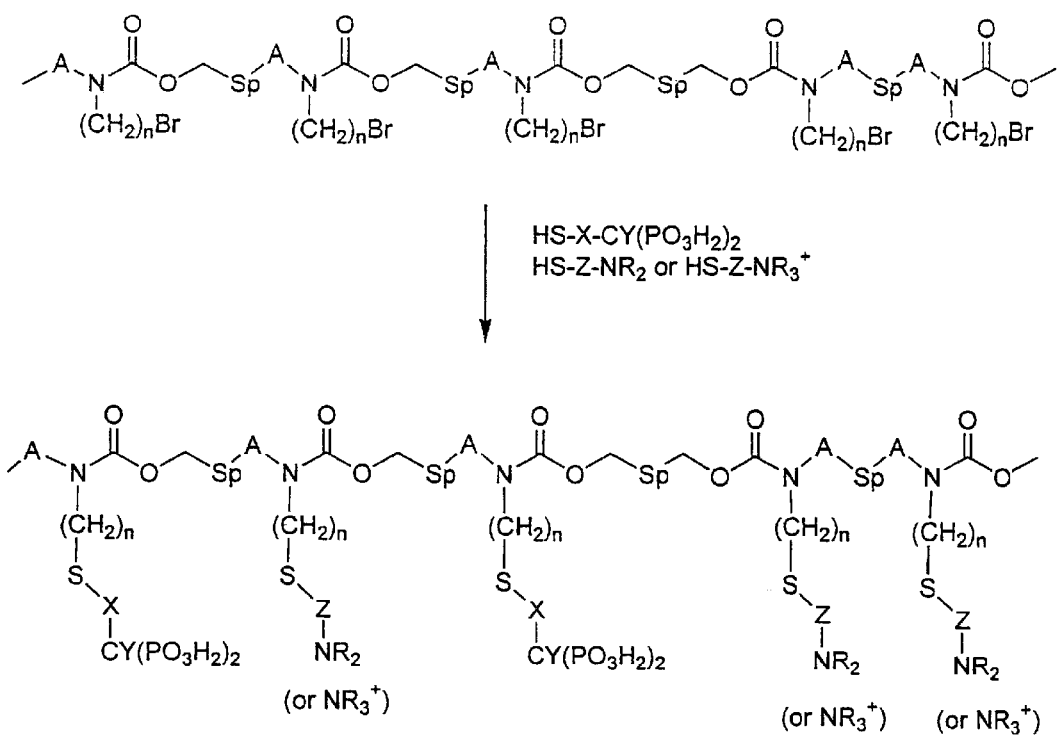
FIG. 6 is a reaction scheme described herein for derivatization of a polyurethane using both a thiol bisphosphonate compound and a thiol compound having permanently-charged (e.g., $NR_3^+$) or chargeable (e.g., —$NR_2$) group (e.g., a compound such as HS—Z—$NR_2$ or HS—Z—$NR_3^+$).
Figure 7:
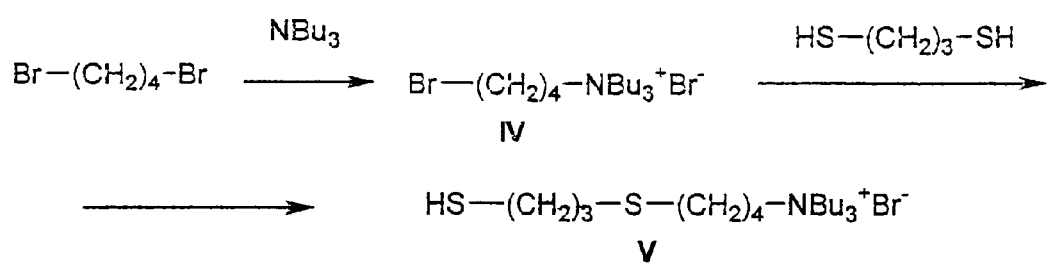
FIG. 7 is an example of a reaction scheme by which a thiol-containing quaternary ammonium salt (tributyl-4-mercaptobutyammonium bromide {compound V}) can be prepared.

An example of how a polyurethane can be derivatized with both geminal bisphosphonate moieties and with cationic moieties is shown in FIG. 6. Thiol group-containing alkylamines can be used, in a manner analogous to the use of thiol group-containing geminal bisphosphonate compounds described above, to attach cationic groups to the polyurethane backbone. An example of a commercially available thiol-containing alkylamine compound is 2-diethylaminoethanethiol. Such compounds can also be synthesized as shown in FIG. 7. By way of example, a polyuretha compound can be modified such that it comprises pendant substituents having the structure

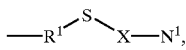

wherein $R^1$ is an organic radical,
  wherein X is selected from the group consisting of a $C_1$ to $C_{18}$ alkylene, a $C_1$ to $C_{18}$ alkenylene, a $C_1$ to $C_{18}$ arylene, a $C_1$ to $C_{18}$ alkylene having one or more O, S, or N atoms incorporated into the alkylene chain, a $C_1$ to $C_{18}$ alkenylene having one or more O, S, or N atoms incorporated into the alkenylene chain, and a heterocyclic radical, and
  wherein $N_1$ is selected from the group consisting of —$NH_3$, a primary organic amine moiety, a secondary organic amine moiety, and a tertiary organic amine moiety. The identity of the organic amine moiety that can be present at $N_1$ is not critical. Preferably, this amine moiety has a generally hydrophilic character (e.g., having a hydrophobicity not greater than that of a tributylamine moiety). Examples of suitable $N_1$ moieties include $C_1$–$C_4$ alkylamine moieties (e.g., diethylamine moieties and tributylamine moieties) and heterocyclic moieties (e.g., an N-morpholino moiety).

A polyurethane can be derivatized simultaneously with a thiol group-containing amine compound and a thiol group-containing geminal bisphosphonate compound. When such simultaneous derivatization is performed, the relative amounts of the two types of compounds can be adjusted, using methods known to the skilled artisan (e.g., taking into account the reactivity of the compounds with the polyurethane), to achieve the desired ratio of geminal bisphosphonate- and cationic group-substituted polyurethane moieties. The thiol group-containing compounds should be used in significant excess (e.g., 3- to 20-fold excess) to the amount of bromoalkyl group (carboxyalkyl, epoxide, or other reactive group) present on the polyurethane. Of course, polyurethane derivatizing agents other than thioalkylamines can be used to modify a polyurethane such that it has cationic moieties attached to the polyurethane backbone.

The invention is now described with reference to the following Examples. These Examples are provided for the purpose of illustration only and the invention should in no way be construed as being limited to these Examples, but rather should be construed to encompass any and all variations which become evident as a result of the teaching provided herein.

EXAMPLE 1

Geminal Bisphosphonate Derivatization of Polyurethane Using 1,ω-Dibromoalkyl Linking Groups The experiments presented in this example demonstrate preparation of geminal bisphosphonate-derivatized polyurethanes made by grafting a 1,ω-dibromoalkyl compound to urethane amino moieties of the polyurethane backbone to yield an ω-bromoalkyl-derivatized polyurethane to which a thiol-containing bisphosphonate can be grafted.

Synthesis of ω-Bromoalkylated Polyurethane

Figure 1B:
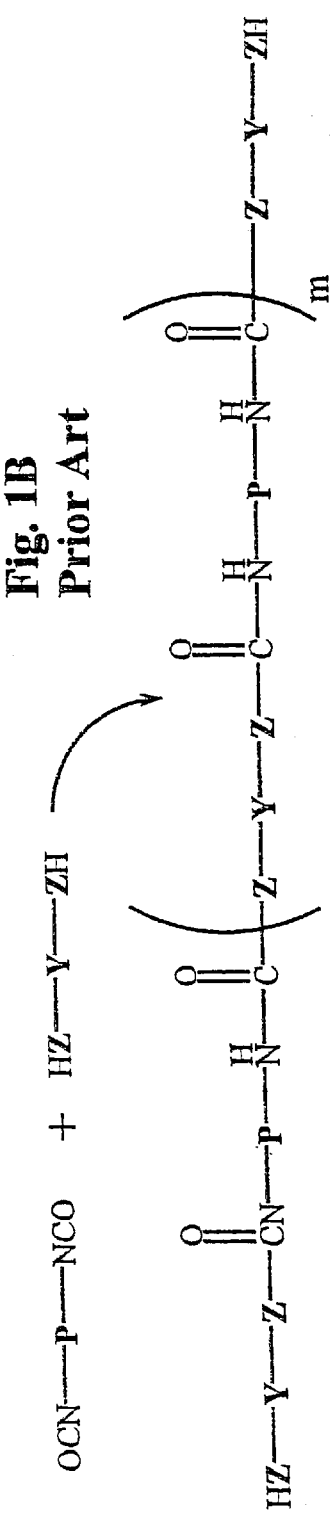

Polyurethane F2000 PEU was thoroughly dried and dissolved in dry N,N-dimethylacetamide under an argon atmosphere. Polyurethane F2000 PEU was a batch of medical grade polyether-urethane prepared by Sulzer Carbomedics, Inc. (Austin, Tex.) using 4,4-methylenebis (phenylisocyanate), polytetramethyleneoxide having a molecular weight of about 1,000, and 1,4-butanediol as a chain extender, according to the method depicted in FIGS. 1A and 1B. The molar ratio of these components was 5:2:3, with the hydroxyl excess being about 1.7%. The intrinsic viscosity of this polymer at 25° C. in N,N-dimethylacetamide was 1.04 dl/g. The polyurethane preparation had the following elemental content: C 67.27%; H 9.56%; N 2.62%, and contained 1.87 millimoles of urethane groups per gram.

The solution of polyurethane F2000 PEU in N,N-dimethylacetamide was maintained at −5° C. and was stirred vigorously. Sodium hydride (or, in some experiments, lithium diisopropylamide; LDA) was added to the solution in an amount equal to 5 to 15 mole percent relative to the molar amount of urethane amino groups in the polyurethane solution (as calculated by elemental analysis of F2000 PEU). Stirring was continued and the solution was maintained at −5° C. for up to about 15 minutes, after which time formation of polyanionic polyurethane was assumed to be complete.

An approximately 10-fold excess (relative to the molar amount of sodium hydride or LDA used) of 1,6-dibromohexane was introduced into the solution. When LDA was used, 1,6-dibromohexane was added to the reaction mixture prior to adding LDA. This mixture was maintained at 0 to 2° C. for 4 to 5 hours with vigorous stirring. When necessary (e.g., when LDA was used), the mixture was acidified by addition of acetic acid. Polyurethane was precipitated from the mixture using cold (i.e., usually −30 to −60° C., but sometimes as low as −78° C.) methanol. The precipitated polymer was washed thoroughly with methanol, washed thoroughly with water, and then dried. Next, the dried polymer was dissolved in N,N-dimethylformamide (DMF), and the resulting solution was filtered to remove insoluble impurities. The polymer was precipitated from the DMF using cold methanol, washed with methanol, washed with water, and then dried in a lyophilizer until its weight was constant over time.

Lyophilized polymers prepared in this manner in various experiments contained from 0.3 to 1.7 weight % bromine (i.e., 37.5 to 212.5 micromoles of ω-bromoalkyl groups per gram of polymer), corresponding to addition of an ω-bromoalkyl substituent to 2 to 12% percent of the urethane nitrogens of the polyurethane backbone. $^1$H nuclear magnetic resonance (NMR) spectroscopy-derived estimates of the degree of ω-bromoalkylation of the polymer yielded similar results. Substantially no change was detected in the intrinsic viscosity of the ω-bromoalkylated polyurethane, relative to non-reacted polyurethane.

Synthesis of Geminal Bisphosphonate-derivatized Polyurethane

A solution of the ω-bromoalkylated polyurethane in N,N-dimethylacetamide was combined with a solution of a bisphosphonate thiol having the structural formula I or II in the same solvent.

$$HS-CH_2-CH(PO_3H_2)_2 \quad (I)$$

$$HS-(CH_2)_3-S-CH_2-CH(PO_3H_2)_2 \quad (II)$$

Figure 4A:
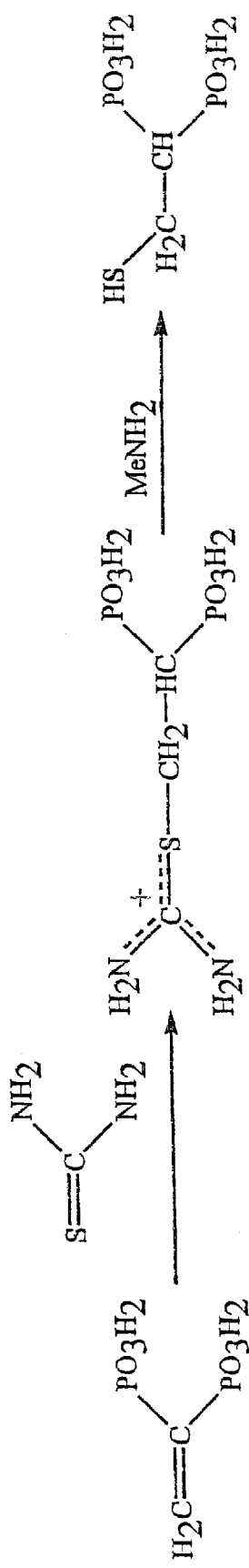
FIGS. 4A and 4B, is a pair of reaction schemes which illustrate how geminal bisphosphonate thiols described herein were generated.
Figure 4B:
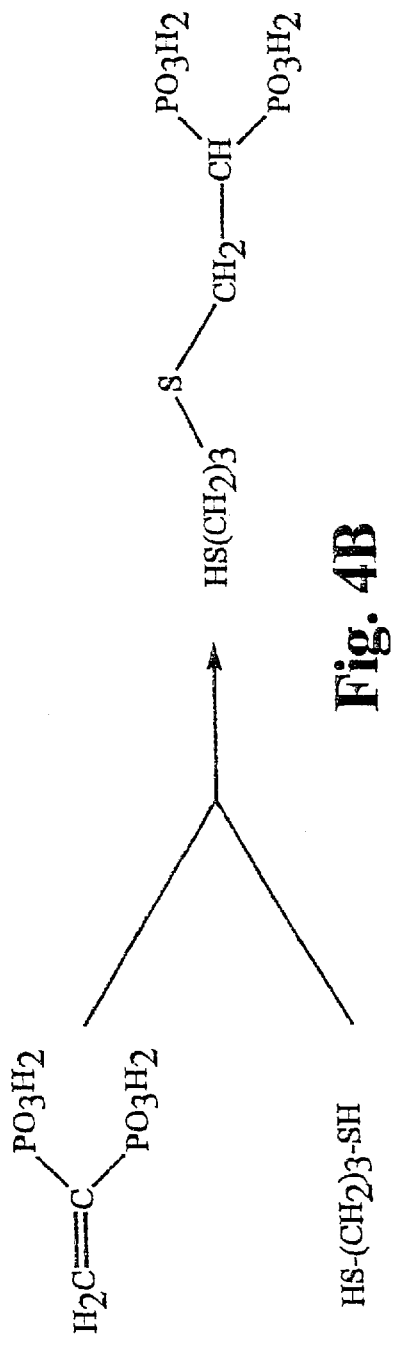

Compounds I and II were prepared as illustrated in FIG. 4. Compound I was synthesized as described (Cohen et al., 1998, Pharma. Res. 15:607), and compound II was synthesized as described in Example 5. Synthesis of compound II yielded a mixture of 85% compound II and 15% compound III.

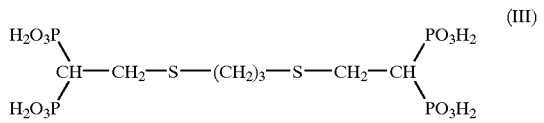

The mixture of II and III was used without further purification, since compound III does not have a thiol group which would be expected to react with the activated polyurethanes described herein. Further details of this synthesis are included in Example 5 herein.

The bisphosphonate thiol was used in an amount which was calculated to be a 10- to 20-fold molar excess, relative to the molar amount of bromine in the polymer. A 2- to 3-fold molar excess (relative to-the molar amount of the bisphosphonate thiol) of N,N-diisopropylethylamine was added to the mixture, and the resulting reaction mixture was maintained under an argon atmosphere at 20° C. to 25° C. for 20 to 30 hours, and then at 37° C. to 39° C. for 25 to 40 hours. After his period, the excess amine was neutralized using acetic acid, and the polymer was precipitated, washed, and dried as described above.

The phosphorous content of the resulting polymer was determined to be 0.17 to 0.63 weight %, and the content depended upon the extent of ω-bromoalkyl substitution of the polymer. These data indicate that attachment of the bisphosphonate thiol to ω-bromoalkyl groups was substantially quantitative.

EXAMPLE 2

Geminal Bisphosphonate Derivatization of Polyurethane Using ω-Bromocarboxylic Acid Linking Groups The experiments presented in this example demonstrate preparation of geminal bisphosphonate-derivatized polyurethanes made by grafting an ω-dibromocarboxylic acid compound to urethane amino moieties of the polyurethane backbone to yield an ω-carboxyalkyl-derivatized polyurethane to which an amino-bisphosphonate can be grafted upon activation of the ω-carboxyl group by, for example, N-hydroxysuccinimide ester in the presence of a carbodiimide.

Synthesis of ω-Carboxyalkyl-substituted Polyurethane

Polyurethane F2000 PEU was dissolved in dry N,N-dimethylacetamide and maintained under an argon atmosphere. An ω-bromocarboxylic acid (ω-bromohexanoic acid in some experiments, ω-bromoundecanoic acid in other experiments) was added to the solution in an amount equal to 5 to 10 molar percent relative to the molar amount of urethane amino groups in the polyurethane solution (as calculated by elemental analysis). The mixture was cooled to −5° C., and a solution of LDA was added, in an amount equal to a 2.5-fold molar excess relative to the amount of the ω-bromocarboxylic acid. This was done in order to change the ω-bromocarboxylic acid into its lithium salt (to maintain its solubility) and to form polyanionic polyurethane. The mixture was maintained at 0° C. to 10° C. for 3 to 5 hours. After this period, the mixture was acidified with acetic acid, and the polymer was precipitated with cold methanol, washed with methanol, washed with a 2%(w/v) aqueous solution of citric acid, washed with water, and then dried in a lyophilizer.

$^1$H NMR spectroscopy indicated that from 2% to 7% (depending on the experiment) of the nitrogen atoms of the polyurethane backbone were substituted with an ω-carboxyalkyl group. Potentiometric titration of carboxyl groups using tetrabutylammonium hydroxide in DMA yielded similar estimates of N-ω-carboxyalkyl substitution in the polymer. It was estimated that nearly all ω-bromohexanoic acid and 60% to 70% of ω-bromoundecanoic acid was consumed in the respective reactions. Substantially no change was detected in the intrinsic viscosity of the ω-carboxyalkylated polyurethane, relative to non-reacted polyurethane.

Synthesis of Geminal Bisphosphonate-derivatized Polyurethane

ω-Carboxyalkyl-substituted polyurethane was dissolved in tetrahydrofuran (THF), and N-hydroxysuccinimide and 1,3-dicyclohexylcarbodiimide were added thereto, each at about a 10-fold molar excess relative to the molar amount of carboxyl groups in the polymer. This mixture was stirred at 20° C. to 25° C. for 20 to 40 hours, and then the precipitate (believed to be 1,3-dicyclohexylurea) was filtered therefrom. The polymer was precipitated from the filtrate using hexane. The precipitated polymer was thoroughly washed with hexane and dried in vacuo. The dried polymer (i.e., wherein the carboxyl groups had been activated by N-hydroxysuccinimide esterification) was dissolved in dry N,N-dimethylacetamide. A solution of 3-amino-1-hydroxypropylidene-1,1-bisphosphonic(pamidronic) acid mono-tetrabutylammonium salt in dry N,N-dimethylacetamide was added in an amount equal to a 10-to 25-molar excess relative to the number of carboxyl groups in the polymer. A 3- to 4-fold molar excess of tributylamine, relative to the molar amount of the salt, was added to the mixture in order to activate the amino groups of pamidronate. The mixture was maintained at 37° C. to 39° C. for 25 to 40 hours. Excess tributylamine was neutralized by addition of acetic acid. The resulting polymer was precipitated using cold methanol, washed with methanol, washed with water, and dried in a lyophilizer.

Preliminary investigations of this polymer indicated that about 70% of the carboxyl groups of the polymer had bisphosphonate moieties attached thereto.

In a variation of this method, N,N-dimethylformamide is used as a solvent for both steps of the reaction. Excess 1,3-dicyclohexylcarbodiimide is removed by precipitation of the polymer with very cold (i.e., −50° C. to −60° C.) methanol. This variant can be preferable in order to avoid reaction of carboxyl groups with hydroxyl-containing impurities. Such impurities are often present in THF due to oxidation of THF. Decomposition of N-hydroxysuccinimide esters does not occur in cold methanol in the absence of a basic catalyst. The extent of carboxyl group modification activated in N,N-dimethylformamide is greater than the extent of modification achieved using polymer activated in THF, and nears 100%. Phosphorous content in polymer made using this modified procedure was about 0.65 weight %, corresponding to modification of about 6% of nitrogen atoms in the polyurethane backbone.

EXAMPLE 3

Modeling of Epoxide Ring Opening in Derivatized Polyurethane

Figure 5:
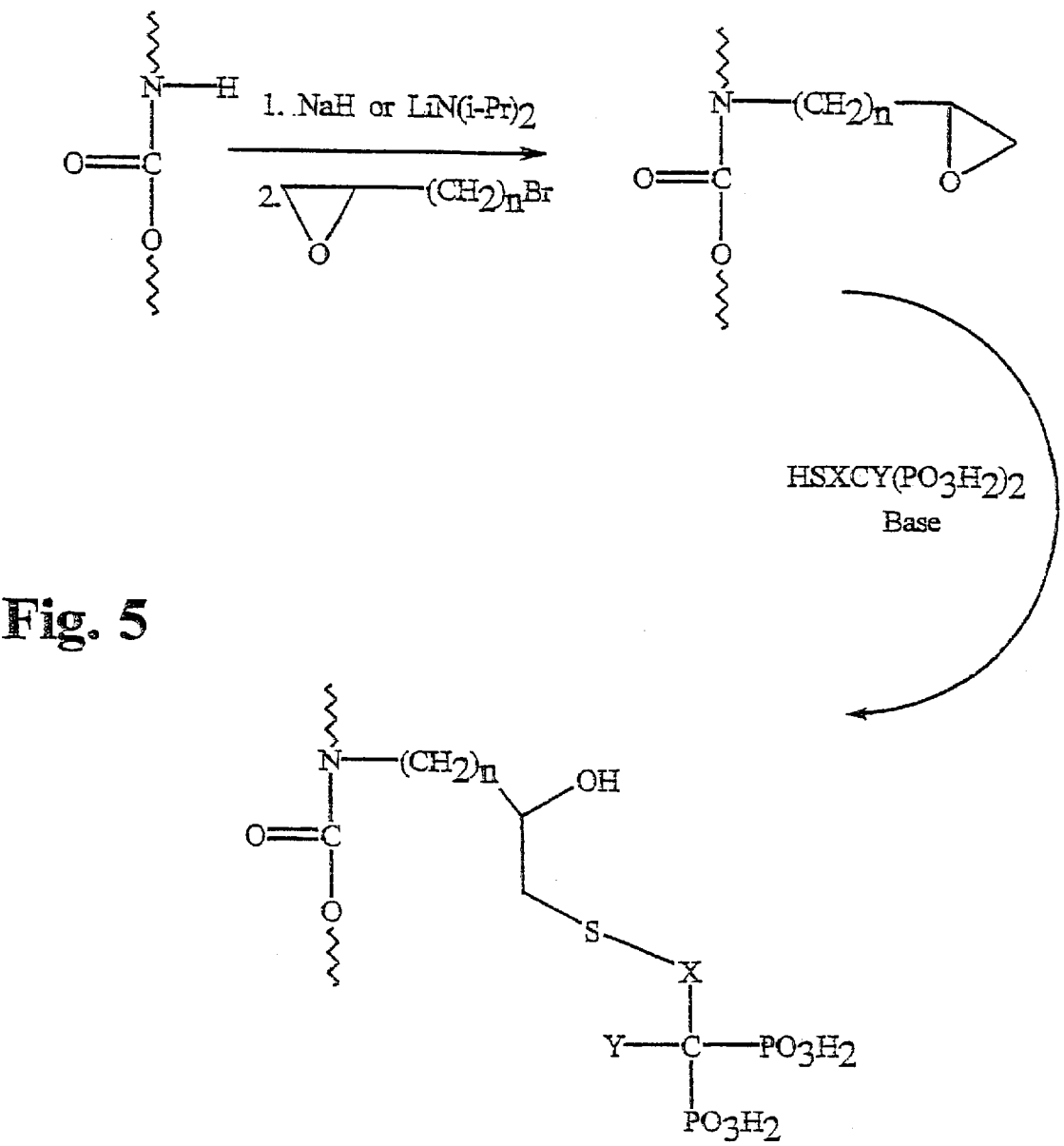
FIG. 5 is a reaction scheme described herein for derivatization of a polyurethane using a bromo-epoxyalkyl compound and a geminal bisphosphonate amine. In this Figure, n can, for example be 2 to 18, and X and Y are as described in the text. The wavy lines represent the polyurethane backbone.

A non-polymeric model (phenyl glycidyl ether) of a glycidylated polyurethane was combined with 1-propanethiol (i.e., a model of the thiol-containing portion of a thiol-bisphosphonate) in N,N-dimethylacetamide in the presence of tetrabutylammonium tetraborate. This reaction models the reaction depicted FIG. 5. The epoxide ring-opening reaction proceeded to completion in no more than about 15 minutes at 0° C., as assessed using $^1$H NMR analysis.

EXAMPLE 4

Properties of Geminal Bisphosphonate Derivatized Polyurethanes

The properties of the geminal bisphosphonate-derivatized polyurethanes prepared according to the methods described in Examples 1 and 2 are described in this example.

It was found that bisphosphonate-derivatized polyurethanes prepared by these two methods (i.e., using ω-bromoalkylated or ω-carboxyalkylated intermediates) had similar properties. The polymers remain soluble in THF and N,N-dimethylacetamide when the counter-ions of the phosphonate groups are organic ions (e.g., tetrabutylammonium, tributylammonium, and mixtures thereof). Solutions of the polymers are highly viscous, which indicates that derivatization of the polymers did not cause significant degradation of polyurethane chains. Use of sodium ions as counter-ions of the phosphonate groups led to insolubility of the geminal bisphosphonate-derivatized polymers in all solvents tested. These results indicate that the geminal bisphosphonate-derivatized polyurethanes of the invention can be cast as, for example, thin films when they have organic counter-ions, and that treatment of the film with a reagent such as sodium acetate in methanol (i.e., to change the counter-ion) will result in insolubilization of the film.

The geminal bisphosphonate-derivatized polyurethanes of the invention are able to absorb significant amounts of water (i.e., 7% to 20% by weight of dry polymer, depending on the extent of derivatization). Hydrated films of the geminal bisphosphonate-derivatized polyurethanes of the invention retain a significant portion of their dry mechanical strength. In this regard, the derivatized polyurethanes resemble structural extracellular matrix biopolymers such as collagen.

$^{31}$P NMR spectroscopic analysis of the geminal bisphosphonate-derivatized polyurethanes of the invention indicated that, as expected, substantially all phosphorous contained in the polymers was attached to the polymers, in accordance with FIGS. 2 and 3. NMR peaks were observed at 20 parts per million for pamidronate-modified polyurethane and at 19 parts per million for thiol-bisphosphonate-modified polyurethanes. From 65% to 100% of the total phosphorous detected by NMR was in these NMR peaks. While not wishing to be bound by any particular theory, it is believed that the balance of phosphorus detected in polymers prepared by ω-bromoalkylation is attributable to partial O-alkylation of phosphonic groups with the bromoalkyl groups of polymers, whereas in the pamidronate-modified polymers, the balance is most likely due to formation of pyrophosphonate bonds.

Fourier transform infrared spectroscopic analysis of bisphosphonate-derivatized polymers prepared by ω-bromoalkylation or by ω-carboxyalkylation could not be used to distinguish these polymers from non-derivatized polyurethane.

Differential scanning calorimetry of the derivatized polymers indicated that the glass transition temperature of these polymers were essentially the same as the glass transition temperature of non-derivatized polymers.

EXAMPLE 5

Synthesis of Compound II 3.00 Grams of vinylidenebisphosphonic acid (VBP) hydrate (i.e., 15.0 millimoles of the anhydrous acid) was dissolved in 5 milliliters of water and neutralized using 14.7 milliliters of 40% aqueous tetrabutylammonium hydroxide (i.e., about 22.4 millimoles of the anhydrous base) to achieve a pH of about 4. The solution was vacuum dried at 50° C. and 20 millimeters of mercury. The residue was co-evaporated with 30 milliliters of 1-butanol in vacuo at 60° C. and 20 millimeters of mercury. The residual syrup, containing VBP tetrabutylammonium salts (13.52 grams) was diluted with about 6 milliliters of 1-butanol, maintained under a stream of argon, mixed with about 75 millimoles of 1,3-propanedithiol, and stirred at 120 to 122° C. for 2.5 hours.

After cooling the mixture to room temperature, it was diluted with about 250 milliliters of water, extracted twice using 250 and then 100 milliliters of hexane to remove non-reacted dithiol. The aqueous layer was dried in vacuo, co-evaporated with about 100 milliliters of N,N-dimethylacetamide at 1 millimeter of mercury and 50° C. The residual syrup (15.5 grams) was diluted using N,N-dimethylacetamide (DMA) to about 25 grams (i.e., about 24 milliliters, using about 9.5 grams of DMA). $^{-}$P NMR analysis of the solution indicated that the bisphosphonate compounds in the solution consisted of about 85 mole % compound II and 15 mole % compound III. No non-reacted VBP could be detected. The concentration of compound II in the solution was determined to be about 0.53 molar.

EXAMPLE 6

Bisphosphonate Derivatization of a Commercially Available Polyurethane-Urea

In the experiments described in this Example, a commercially available polyurethane was bromoalkylated and then derivatized with a bisphosphonate-containing compound.

ω-Bromoalkylation of Polymer

Medical grade polyurethane-urea designated BIOSPAN™ was obtained from Polymer Technology Group Medical, LLC (Berkeley, Calif.) as a 24% (w/w) solution in DMA. The polymer was precipitated using cold methanol, thoroughly washed with methanol and then with water, and lyophilized to constant weight. The polyurethane preparation had the following elemental content: C 66.62%; H 9.79%; N 2.99%, exhibited a ration of urethane:urea of 1.5:1 (as assessed by $^1$H NMR), and contained 0.91 millimoles of urethane groups per gram.

About 15.5 grams of dry polymer (i.e., about 14.2 millimoles of urethane linkages and about 9.45 millimoles of urea linkages, as assessed by elemental and $^1$H-NMR analysis) was soaked overnight in 150 milliliters of toluene and evacuated for 4 hours at 35 to 45° C. and 1 millimeter of mercury in order to remove any remaining water. The polymer was dissolved in 330 milliliters of anhydrous DMA under an argon atmosphere and maintained under dry argon flow About 4.6 milliliters (i.e., about 30 millimoles) of 1,6-dibromohexane was added to the mixture, and it was cooled to −5° C. A solution of 2.7 millimoles of LDA in 15 milliliters of dry DMA was added dropwise to the mixture during a 5 minute period in which the mixture was vigorously stirred. Stirring continued and the mixture was maintained at −1 to 1° C. for 3 hours. After this period, the mixture was neutralized using about 1.2 milliliters (i.e., about 21 millimoles) of acetic acid. Argon flow was halted, and the reaction mixture was poured into about 1.2 liters of cold (−60° C.) methanol. The methanol mixture was warmed to 10° C., and coagulated polymer was removed by filtration. The polymer was washed with 600 milliliters of methanol in several aliquots and with 1 liter of water thereafter. The polymer was stirred with about 600 milliliters of water for 2 hours, collected, washed with water, and lyophilized.

In order to remove residual 1,6-dibromohexane, 15.3 grams of the crude polymer was dissolved in 300 milliliters of DMF and passed through a fritted glass filter. The polymer was precipitated from the filtrate using cold methanol, filtered, washed, and lyophilized as described above. Yield of the bromoalkylated polymer was 14.5 grams. It was determined that the bromoalkylated polymer contained 0.62 weight % bromine, corresponding to addition of about 78 micromoles of ω-bromohexyl groups per gram of polymer.

Bisphosphonate Modification of ω-Bromoalkylated Polymer

About 2.20 grams (i.e., containing about 0.17 millimoles of ω-bromohexyl groups) of the bromoalkylated polymer was dissolved in 45 milliliters of dry DMA and maintained under argon flow. The solution was cooled to −5° C. While the solution was vigorously stirred, about 5.0 milliliters of a 0.53 molar solution of 2-(3-mercapto-propylthio)ethylidene-1,1-bisphosphonate (compound II) was added to the solution. Next, about 8.65 milliliters of a 0.26 molar solution of $(Bu_4N)_2B_4O7$ in DMA was added to the solution. The mixture was stirred at 0 to 5° C. for 30 minutes and then acidified by addition of 3.2 milliliters (56 millimoles) of acetic acid. The resulting polymer was precipitated using about 600 milliliters of cold (−60° C.) methanol, filtered, washed with about 300 milliliters of methanol, washed with about 1 liter of water, and stirred in about 500 milliliters of water for 2 hours. The polymer was once again collected, washed with about 1 liter of water, and lyophilized to constant weight (2.17 grams).

Phosphorous analysis of the collected polymer indicated that the polymer contained 0.507 weight % phosphorous, corresponding to modification of the polymer with 82 micromoles of bisphosphonyl groups per gram of polymer. $^-$P NMR of the polymer in a mixture of DMA and DMSO-$d_6$) indicated a single peak at 19.5 parts per million. No unintended reaction products could be detected.

About 0.6 grams of the polymer was dissolved in DMA and used to cast a film. The film was treated at room temperature using two aliquots of a solution, wherein each aliquot consisted of 5 grams of sodium acetate in a mixture of 13 milliliters of water and 18 milliliters of ethanol. Total treatment time was 46 hours. The resulting film of bisphosphonate-derivatized polymer, in its sodium salt form, was insoluble in DMA and in other solvents which were tested. The film absorbed water in an amount equal to about 19.9% of its weight.

EXAMPLE 7

Bisphosphonate Derivatization of a Commercially Available Polycarbonate-Urethane In the experiments described in this Example, a commercially available polyurethane was bromoalkylated and then derivatized with a bisphosphonate-containing compound.

ω-Bromoalkylation of Polymer

Medical grade polycarbonate-urethane designated BIONATE™ 80A was obtained from Polymer Technology Group Medical, LLC (Berkeley, Calif.) as solid pellets. The polyurethane preparation had the following elemental content: C 62.46%; H 7.48%; N 3.41%, and contained 2.43 millimoles of urethane groups per gram. About 15.5 grams (i.e., containing about 38 millimoles of urethane groups) of the pellets were soaked overnight in about 150 milliliters of toluene. Excess toluene was removed, and the swollen pellets were rinsed with about 50 milliliters of toluene and then evacuated at 35 to 45° C. and 1 millimeter of mercury for 4 hours. Under dry argon flow, the polymer was dissolved in about 330 milliliters of anhydrous DMA, and about 5.0 milliliters (i.e., about 32 millimoles) of 1,6-dibromohexane was added. This mixture was cooled to −7° C., stirred vigorously, and then a solution of 5.0 millimoles of LDA in 18 milliliters of dry DMA was added dropwise during a 5 minute period. Stirring continued and the mixture was maintained at −1 to 1° C. for 2 hours. After this period, the mixture was neutralized using about 2.4 (i.e., about 44 millimoles) of acetic acid. Argon flow was discontinued, and the reaction mixture was poured into about 1.2 liters of cold (−70° C.) methanol.

The polymer was washed and lyophilized as described in the ω-bromoalkylation portion of Example 6. The yield of ω-bromoalkylated polymer was 15.1 grams, containing 1.07 weight % bromine, which corresponds to about 134 micromoles of bromoalkyl groups per gram of polymer.

Bisphosphonate Modification of ω-Bromoalkylated Polymer

About 4.78 grams of the bromoalkylated polymer (i.e., about 0.64 millimoles of ω-bromohexyl groups) was dissolved in about 95 milliliters of dry DMA, maintained under dry Argon flow, and cooled to −5° C. While stirring the solution vigorously, about 7.0 milliliters of a 0.53 molar solution of compound II in DMA was added. Next, about 20 milliliters of a 0.19 molar solution of $(Bu_4N)_2B_4O_7$ in DMA was added to the solution. Stirring continued, and the mixture was maintained at −2 to 5° C. for 45 minutes. After this period, the solution was acidified with about 8 milliliters (i.e., about 140 millimoles) of acetic acid. The resulting solution was passed through a fritted glass filter, and the polymer was precipitated using about 500 milliliters of cold (−60° C.) methanol. The precipitated polymer was washed with about 250 milliliters of water, then with about 500 milliliters of water, and then stirred in about 500 milliliters of water for 23 hours. The polymer was once again collected, washed with about 500 milliliters of water, and lyophilized to constant weight (4.88 grams).

Phosphorous analysis of the derivatized polymer indicated that it contained 0.73 weight % phosphorous, corresponding to addition of 118 micromoles of bisphosphonyl groups per gram of polymer. A film was cast using the polymer, as described in Example 6. In its sodium salt form, the film absorbed about 15% of its weight in water.

EXAMPLE 8

Glycidylation of a Commercially Available Polyurethane-Urea

In the experiments described in this Example, a commercially available polyurethane was glycidylated such that it could subsequently be derivatized with a bisphosphonate-containing compound.

About 15.6 grams of dry polyurethane-urea BIO-SPAN™ (obtained and precipitated as in Example 6), containing about 14.2 millimoles of urethane linkages was additionally dried and dissolved in anhydrous DMA (330 milliliters) under dry argon flow, as described above.

About 5.0 milliliters (i.e., about 58 millimoles) of epibromohydrin was added to the mixture, and it was cooled to −9° C. A solution of 7.0 millimoles of LDA in 20 milliliters of dry DMA was added dropwise to the mixture during a 5 minute period in which the mixture was vigorously stirred. Stirring continued and the mixture was maintained at −1 to 1° C. for 2 hours. After this period, the mixture was neutralized using about 4.0 milliliters (i.e., about 67 millimoles) of acetic acid. Argon flow was halted, and the reaction mixture was poured into about 1.25 liters of cold (−60° C.) methanol. The methanol mixture was warmed to 0° C., and coagulated polymer was removed by filtration. The polymer was washed with 400 milliliters of methanol in several aliquots and with 1.3 liter of water thereafter. The polymer was stirred with about 600 milliliters of water for 1 hour, collected, washed with water, and lyophilized.

The resulting product weighed 14.95 grams and contained 0.40 millimoles of epoxy groups per gram of polymer.

EXAMPLE 9

Glycidylation of a Commercially Available Polycarbonate-Urethane

In the experiments described in this Example, a commercially available polyurethane was glycidylated such that it could subsequently be derivatized with a bisphosphonate-containing compound.

About 15.5 grams of polycarbonate-urethane BIONATE™ pellets (as described in Example 7), containing about 38 millimoles of urethane groups was additionally dried and dissolved in anhydrous DMA (330 milliliters), as described above.

The polymer was washed and lyophilized as described in the ω-bromoalkylation portion of Example 7. The yield of glycidylated polymer was 15.6 grams, containing 0.40 millimoles of epoxy groups per gram of polymer.

EXAMPLE 10

Carboxyl Derivatization of the ω-Bromoalkylated Polycarbonate-Urethane of Example 7

In the experiments presented in this Example, the ω-bromoalkylated polyurethane described in Example 7 was further derivatized to yield a polyurethane having carboxyl-containing moieties in place of the bromine atoms.

About 4.06 grams of ω-bromoalkylated polycarbonate-urethane (i.e., about 0.54 millimoles of ω-bromohexyl groups; derived from BIONATE™ 80A, as described in Example 7) was dissolved in about 60 milliliters of dry DMA, maintained under an argon atmosphere, and cooled to 0° C. While the solution was vigorously stirred, about 20 milliliters (i.e., about 15 millimoles) of a freshly prepared 0.7 molar solution of 3-mercaptopropionic acid tetrabutylammonium salt in DMA was added to the solution. Next, about 20 milliliters (i.e., about 3.8 millimoles) of a freshly prepared 0.19 molar solution of $(Bu_4N)_2B_4O_7$ in DMA was added to the mixture. The mixture was maintained at 0 to 5° C. for 1 hour, and then acidified using about 12 milliliters (i.e., about 210 millimoles) of acetic acid. The polymer was precipitated using about 800 milliliters of cold (−60° C.) methanol, and filtered from the methanol. The polymer was washed with 250 milliliters of methanol, and then with 500 milliliters of water. Next, the polymer was stirred for 18 hours with 600 milliliters of a 1% aqueous solution of citric acid, once again collected, washed with about 600 milliliters of water, and then lyophilized to constant weight (3.99 grams).

$^1$H NMR analysis in DMF-$d_7$ indicated that the polymer exhibited two peaks, one at 2.53 part per million, and the other at 2.60 part per million (both t, two $CH_2S$, one corresponding to 3-mercaptopropionic acid, and the other corresponding to 1,6-hexylene), in amounts corresponding to the content of ω-bromohexyl groups in the initial bromoalkylated polymer. These results indicate that substantially all bromoalkyl groups reacted during the experiments described in this example to yield a polymer having —$(CH_2)_6$—S—$(CH_2)_2$—COOH groups attached thereto. The polymer could be esterified using N-hydroxysuccinimide.

EXAMPLE 11

Lack of Degradation of Polyurethanes Upon Derivatization

Degradation of polyurethanes (PEU, PUU, and PCU) derivatized as described above was assessed by analyzing starting polyurethane and derivatized polyurethane by size exclusion chromatography (SEC). SEC was performed as describe in Santerre et al., 1992, J. Biomed. Mater. Res. 26:39–57, except that four WATERS™ (Milford, Mass.) ULTRASTYRAGEL™ columns (maintained at 80° C.) were used in series. The column packings had pore diameters of (from pump to detector) $10^5$, $10^4$, $10^4$, and $10^3$ Angstroms. A WATERS™ model 410 refractometer was used as a detector. The mobile phase was DMF comprising 0.08 molar $Bu_4N^+$ $Br^-$. Number average molecular weight ($M_n$) values were calculated using polystyrene standards having narrow molecular weight distributions in the range 9,000 to 600,000. These number average molecular weights are presented in Table I.

TABLE I

| Polymer | Derivatization | Degree of Derivatization (millimoles/gram) | $M_n$ (Daltons) |
|---|---|---|---|
| PEU | none | — | 164,000 |
| PEU | —$(CH_2)_6Br$ | 0.09 | 173,000 |
| PEU | —$(CH_2)_5COOH$ | 0.10 | 158,000 |
| PEU | —$(CH_2)_6S(CH_2)_3SCH_2CH(PO_3H_2)_2$ | 0.09 | 232,000 |
| PEU | —$(CH_2)_5CONHCH_2CH_2C(OH)(PO_3H_2)_2$ | 0.10 | 254,000 |
| PUU | none | — | 214,000 |
| PUU | —$(CH_2)_6Br$ | 0.15 | 181,000 |
| PUU | —$(CH_2)_5COOH$ | 0.23 | 159,000 |
| PUU | —$(CH_2)_6S(CH_2)_3SCH_2CH(PO_3H_2)_2$ | 0.08 | 214,000 |

TABLE I-continued

| Polymer | Derivatization | Degree of Derivatization (millimoles/gram) | $M_n$ (Daltons) |
|---|---|---|---|
| PCU | none | — | 242,000 |
| PCU | —$(CH_2)_6Br$ | 0.08 | 234,000 |
| PCU | —$(CH_2)_5COOH$ | 0.25 | 152,000 |
| PCU | —$(CH_2)_6SCH_2CH_2COOH$ | 0.13 | 242,000 |
| PCU | —$(CH_2)_6S(CH_2)_3SCH_2CH(PO_3H_2)_2$ | 0.09 | 267,000 |

The data presented in Table I indicate that no significant degradation of polyurethane backbone was caused by bromoalkylation thereof or during reaction of the bromoalkylated polymer with a thiol-containing compound. Increase in $M_n$ was observed for bisphosphonate-modified polymers, probably due to incompletely-suppressed electrostatic effects. Direct carboxylation (i.e., PEU, PUU, and PCU derivatized with —$(CH_2)_5COOH$) resulted in limited backbone degradation. However carboxylation of polymers by bromoalkylation avoided this degradation, and can be a preferred synthetic method for this reason.

EXAMPLE 12

Water Uptake by Bisphosphonate-Derivatized Polyurethane

Bisphosphonate-derivatized polyurethane (prepared as described herein) were cast as films in a dry, room temperature air atmosphere on a TEFLON™-coated surface from filtered solutions of 3–4% (w/v) derivatized PEU or PCU polymers in THF or from filtered solutions of 3–4% (w/v) derivatized PUU in DMA. Polymer amounts were selected to form films having a thickness of 0.1 to 0.2 millimeters. Once formed, the films were contacted with water, and the water uptake was assessed. The results of these experiments are presented in Table II.

TABLE II

| Polymer | Derivatization | Degree of Derivatization (millimoles/gram) | Water Uptake (wt %) |
|---|---|---|---|
| PEU | —$(CH_2)_6S(CH_2)_3SCH_2CH(PO_3H_2)_2$ | 0.09 | 20.7 |
| PEU | —$(CH_2)_5CONHCH_2CH_2C(OH)(PO_3H_2)_2$ | 0.10 | 20.5 |
| PUU | —$(CH_2)_6S(CH_2)_3SCH_2CH(PO_3H_2)_2$ | 0.10 | 26.8 |
| PUU | —$(CH_2)_6SCH_2CH(PO_3H_2)_2$ | 0.08 | 21.5 |
| PCU | —$(CH_2)_6S(CH_2)_3SCH_2CH(PO_3H_2)_2$ | 0.12 | 15.0 |
| PCU | —$(CH_2)_6S(CH_2)_3SCH_2CH(PO_3H_2)_2$ | 0.09 | 7.2 |

Water uptake by bisphosphonate-modified polyurethane cast films (sodium salts) increased with the degree of derivatization, and did not appear to depend on the nature of the bisphosphonate derivative. However, the type of polyurethane influenced water uptake, in that polyurethanes derivatized using the same bisphosphonate exhibited differing water uptake characteristics. Derivatized PCU absorbed relatively little water, but derivatized PEU and PUU absorbed significantly more.

EXAMPLE 13

In Vivo Calcification Resistance of Bisphosphonate-Derivatized PUU

Films cast from polyurethane or from bisphosphonate-derivatized (0.09 millimoles bisphosphonate per gram of polymer) PUU were implanted subdermally into rats which to which dihydrotachysterol had been administered 24 hours previously, as described (Joshi et al., 1996, J. Biomed. Mater. Res. 31:201–207). The films were maintained in the rats for 60 days, and were then retrieved for assessment of calcification thereon. Calcification upon the non-modified polyurethane film amounted to 387.44±154.7 nanograms per milligram of film. Calcification upon the bisphosphonate-derivatized PUU film amounted to 72.33±26.8 nanograms per milligram of film.

EXAMPLE 14

Bromoalkylation of Polyurethane-Urea Using 1,4-Dibromobutane

PUU (BIOSPAN™; 24.6 grams of dry polymer, containing about 22 millimoles of urethane linkages) was prepared for reaction as described in Example 6, dissolved in 400 milliliters DMA, and maintained under dry argon flow. Freshly distilled 1,4-dibromobutane (19 milliliters, 159 millimoles) was mixed with this solution, and the mixture was cooled to −5° C. A solution comprising 11 millimoles of lithium diisopropylamide (LDA) in 35 milliliters of dry DMA was added dropwise over the course of 15 minutes, while the mixture was maintained at −5 to −7° C. and vigorously stirred. The mixture was, thereafter maintained, with stirring, at −1 to 1° C. for 1 hour, and then neutralized using 6.5 milliliters (114 millimoles) of acetic acid. Argon flow was halted, the reaction solution was filtered, and the filtrate was poured into 1700 milliliters of cold (−40° C.) methanol. After warming this mixture to about 0° C., the polymer was filtered off, thoroughly washed using 600 milliliters of methanol, 300 milliliters of isopropanol, 500 milliliters methanol, and then 1500 milliliters of water. The resulting sponge-like coagulate of polymer was stirred in the presence of 2000 milliliters of water for 10 hours, collected, washed with water, and lyophilized to a constant weight of 22.1 grams. $^1H$ NMR spectral analysis of the product (using DMF-$d_7$ as a solvent) indicated that the bromoalkylated polymer contained about 0.2 millimole of bromoalkyl groups per gram of polymer

EXAMPLE 15

Bromoalkylation of Polyether-Urethane Using Lithium tert-Butoxide

Medical grade polyether-urethane (TECOTHANE™ TT-1074A, Thermedics, Inc., Woburn, Mass.) was obtained in the form of solid pellets. The polymer was manufactured from 4,4-methylenebis (phenyl isocyanate), polytetramethylene oxide, and 1,4-butanediol as a chain extender. $^1$H NMR-spectral analysis indicated that the polymer contained about 2.3 millimoles of urethane linkages per gram of polymer.

About 15.8 grams of pellets (containing about 36 millimoles of urethane groups) were gently stirred in 200 milliliters toluene for 3 days. The polymer was separated, washed with two individual portions 60 milliliters aliquots of toluene, and maintained at 40–50° C. and a pressure of 0.1 millimeter of mercury for 5 hours. The vacuum was relieved using dry argon, and the polymer was dissolved in 300 milliliters of dry DMA and maintained under constant flow of dry argon.

Freshly distilled 1,4-dibromobutane (15 milliliters, 126 millimoles) was added to the mixture, the mixture was cooled to −5° C., and 7.6 milliliters of a 1 molar solution of lithium tert-butoxide in hexanes (i.e., 7.6 millimole lithium tert-butoxide) diluted with 20 milliliters of dry DMA was added dropwise over the course of 10 minutes while the mixture was maintained at −5 to −7° C. and with vigorous stirring. Thereafter, the mixture was maintained with stirring at −1 to 1° C. for 1 hour, and then neutralized using 6.5 milliliters (114 millimoles) of acetic acid. Following neutralization, argon flow was halted, the reaction solution was filtered, and the filtrate was poured into 1200 milliliters of cold (−60° C.) methanol. After warming the mixture to about 0° C., the polymer was separated, thoroughly washed with multiple aliquots of methanol (total of 350 milliliters) and with 300 milliliters of isopropanol. The washed polymer was cut into small (<0.1 gram) pieces. The pieces were vigorously stirred in 300 milliliters of isopropanol for 15 hours in order to remove excess 1,4-dibromobutane. Following this treatment, the pieces were separated from the dibromobutane-containing isopropanol, rinsed with fresh isopropanol, and maintained for 1 hour at room temperature and a pressure of 0.1 millimeter of mercury, in order to remove most of the solvent. The polymer was dissolved in 275 milliliters of DMF, filtered, precipitated with 1200 milliliters of cold methanol as described above, separated, and thoroughly washed with 300 milliliters of methanol.

Polymer chunks were cut into smaller pieces, stirred in the presence of 1500 milliliters of water for 17 hours, separated, and lyophilized to a constant weight of 15.5 grams. $^1$H NMR spectral analysis of the bromoalkylated polymer (using DMF-$d_7$ as a solvent) indicated that the polymer contained about 0.45 millimole of bromoalkyl groups per gram of polymer.

A parallel experiment was performed as described in this Example, wherein LDA (7.6 millimoles; i.e., an equimolar amount) was used in place of lithium tert-butoxide. In this experiment, the bromoalkyl modification of the polymer was only 0.29 millimole/gram (as determined by $^1$H NMR spectral analysis). These experiments suggest that lithium tert-butoxide is less likely to be involved in side reactions (e.g., dehydrobromination of 1,4-dibromobutane) than is LDA. More than 90% of lithium tert-butoxide was spent to initiate the useful reaction of bromoalkylation, whereas for LDA in the analogous experiment this value was only 60%.

EXAMPLE 16

Preparation of Bisphosphonate-Diethylamino-Modified Polyurethane-Urea 15.5 Grams of bromoalkylated polyurethane-urea (BIOSPAN™; prepared as described in Example 14; containing about 3.1 millimoles of bromobutyl groups) was dissolved in 255 milliliters of dry DMA and maintained under constant flow of argon. The mixture was cooled to −2° C., and 40 milliliters of a DMA-solution comprising 0.365 grams of commercial 96% 2-diethylaminoethanethiol hydrochloride salt (about 2.1 millimoles of aminothiol hydrochloride) was added thereto. Next, 19.6 milliliters of a solution comprising approximately 0.64 molar 2-mercaptoethylidene-1,1-bisphosphonate (compound I, tetrabutylammonium salt) and about 1.5 moles of $Bu_4N^+$ per mole of bisphosphonate in DMA was introduced at the same temperature. Finally, 65 milliliters of a freshly-prepared 0.18 molar solution of $(Bu_4N)_2B_4O_7$ (i.e., about 12 millimoles) in DMA was added in order to activate thiol groups. The (homogeneous) mixture was maintained for 1 hour at 0° C. with stirring and under argon flow. The base was neutralized using 8.5 milliliters (i.e., 148 millimoles) of acetic acid, and the reaction solution was filtered. The polymer was precipitated using 1500 milliliters of cold (−65° C.) methanol. The polymer coagulate was filtered off, washed with multiple aliquots of methanol (500 milliliters total), and then with a solution consisting of 300 milliliters methanol, 150 milliliters water, and 10 milliliters triethylamine. After additional washing with 400 milliliters of methanol, the polymer was washed with 200 milliliters of a 3% solution of acetic acid in methanol, with 250 milliliters of methanol, and with water.

The resulting flocks of polymer were stirred with a large volume of water for 15 hours, collected on a filter, and lyophilized to a constant weight of 15.1 grams. Phosphorus analysis of the collected polymer indicated a composition comprising 0.366% phosphorus, by weight. This value corresponds to modification of polymer with 59 micromoles of bisphosphonate groups per gram of polymer. $^{31}$P NMR of the polymer (in a mixture of DMA and DMSO-$d_6$) indicated a single broadened peak of uniformly-immobilized bisphosphonate groups at 19.3 parts per million. $^1$H NMR of the polymer (in DMF-$d_7$ acidified with $CF_3COOH$) was indicated the presence of terminal —$CH_3$ moieties of immobilized diethylamino groups as a broadened multiplet at 1.33 parts per million, in an amount of about 0.13 millimole per gram of polymer.

About 1.1 grams of the polymer was dissolved in DMA and used to cast a film. The film was treated with copious amounts of water for several days and air-dried. Water absorption of the film was only 2.6% (by weight, calculated for the dry film).

EXAMPLE 17

Preparation of Bisphosphonate-Tributylamino-Modified BIOSPAN™ PUU

A mixture comprising 9.53 milliliters of tributylamine (i.e., 40 millimoles), 24 milliliters of 1,4-dibromobutane (i.e., 200 millimoles), and 50 milliliters of ethanol was refluxed for 5 hours. The solvent and most of the 1,4-dibromobutane were distilled off in vacuo. The residue was dissolved in water and exhaustively extracted with hexanes to remove non-polar impurities. The aqueous layer was vacuum-dried to yield 15.96 grams of a syrup, which contained mostly tributyl-4-bromobutylammonium bromide (compound IV), as assessed by TLC-analysis (using silica gel, $CHCl_3$: methanol, 9:1 by volume, spot detection in $I_2$-chamber; compound IV having an $R_f$ of about 0.3).

About 6.16 grams of crude compound IV was purified by column chromatography on silica-gel to yield 4.13 grams of almost pure quaternary ammonium salt (compound IV). This product (about 10 millimoles of compound IV) was dissolved in 20 milliliters of isopropanol and 8 milliliters of water, mixed with 5.0 milliliters of 1,3-propanedithiol (i.e., 50 millimoles), and cooled to 0° C. under argon flow. An 18 molar aqueous solution of NaOH (1.15 milliliters, about 20 millimoles) was added to initiate alkylation of thiol groups, and the mixture Was stirred at 0 to 5° C. for 1 hour without interruption of the argon flow. Excess alkali was neutralized using 1.7 milliliters of 8.8 molar aqueous hydrobromic acid (i.e., about 15 millimoles). The mixture was diluted with 200 milliliters of water and exhaustively extracted with hexanes. The aqueous phase was vacuum-concentrated, and then co-evaporated with isopropanol. The residue was diluted with 20 milliliters of toluene. Insoluble material (mostly NaBr) was removed by filtration. The filtrate was dried in vacuo, dissolved in DMA, and diluted to 9.77 using with the same solvent. According to iodometric analysis, the solution contained about 0.74 millimoles of tributyl-4-mercaptobutylammonium bromide (compound V) per gram of solution.

Bromoalkylated PUU (BIOSPAN™ was prepared as described in Example 14 and contained about 0.22 millimole of 4-bromobutyl groups per gram of polymer. About 4.35 grams of this polymer (i.e., comprising about 1 millimole of 4-bromobutyl groups) was dissolved in 80 milliliters of DMA and maintained under argon flow. The solution was cooled to −5° C., and 9.47 grams of the DMA-solution of compound V (i.e., comprising about 7 millimoles of compound V) was added thereto. Next, 6.8 milliliters of a 0.53 molar solution of compound II (i.e., about 3.6 millimoles), obtained as described in Example 5, in DMA was introduced at the same temperature. Thiol groups were activated by adding 25 milliliters of a freshly prepared 0.2 molar solution of $(Bu_4N)_2B_4O_7$ (i.e., about 5 millimoles) in DMA. The resulting (homogeneous) mixture was stirred for 1 hour at 0° C. under constant argon flow. Excess base was neutralized by addition of 8.5 milliliters (149 millimoles) of acetic acid, and the polymer was precipitated in 800 milliliters of cold (−60° C.) methanol.

The flocks of polymer were filtered off, thoroughly washed with methanol, and then with water. The polymer was dried in vacuo and dissolved in 85 milliliters of DMA. The solution was filtered, the polymer was precipitated, washed as described above, and lyophilized to a constant weight of 4.08 grams. Phosphorus analysis indicated that the polymer comprised 0.465% phosphorus, by weight. This value corresponds to 75 micromoles of bisphosphonate groups per gram of polymer. $^1$H NMR analysis of the polymer (in DMF-$d_7$ acidified with $CF_3COOH$) indicated the presence of terminal —$CH_3$ moieties of immobilized tributylamine groups as a broadened triplet at 0.85 parts per million, in an amount of about 0.15 millimole per gram of polymer.

About 0.8 gram of the polymer was dissolved in DMA and used to cast a film. The film was treated with copious amounts of water for several days and air-dried. Water absorption of the film was 2.4% (by weight, calculated for the dry film).

The disclosures of each and every patent, patent application, and publication cited herein are hereby incorporated herein by reference in their entirety.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of making a geminal bisphosphonate-derivatized polyurethane, the method comprising (i) grafting a 1,ω-dibromoalkyl compound with a urethane amino moiety of a polyurethane to form a ω-bromoalkyl-substituted polyurethane and (ii) grafting a geminal bisphosphonate thiol with the ω-bromoalkyl-substituted polyurethane to form the geminal bisphosphonate-derivatized polyurethane, wherein said 1,ω-dibromoalkyl compound is selected from the group consisting of $C_2$–$C_{18}$ 1,ω-dibromoalkyl compounds.

2. A method of making a geminal bisphosphonate-derivatized polyurethane, the method comprising (i) grafting a 1, ω-disbromoalkyl compound with a urethane amino moiety of a polyurethane to form a ω-bromoalkyl-substituted polyurethane and (ii) grafting a geminal bisphosphonate thiol with the ω-bromoalkyl-substituted polyurethane to form the geminal bisphosphonate-derivatized polyurethane, wherein to 1, ω-dibromoalkyl compound is a 1, ω-dibromoalkane.

3. A method of making a geminal bisphosphonate-derivatized polyurethane, the method comprising (i) grafting a ω-bromocarboxylic acid with a urethane amino moiety of a polyurethane to form a ω-carboxyalkyl substituted polyurethane and (ii) grafting a geminal bisphosphonate amine with the ω-carboxyalkyl-substituted polyurethane to form the geminal bisphosphonate-derivatized polyurethane, wherein said ωbromocarboxylic acid is selected from the group consisting of $C_2$–$C_{18}$ ω-bromocarboxylic acids.

4. A method of making a geminal bisphosphonate-derivatized polyurethane, the method comprising (i) grafting a ω-bromocarboxylic acid with a urethane amino moiety of a polyurethane to form a ω-carboxyalkyl substituted polyurethane and (ii) grafting a geminal bisphosphonate amine with the ω-carboxyalkyl-substituted polyurethane to form the geminal bisphosphonate-derivatized polyurethane, wherein said geminal bisphosphonate amine is selected from the group consisting of 3-amino-1-hydroxypropylidene-1, 1-bisphosphonic acid and pamidronic acid.

5. A method of making a geminal bisphosphonate-derivatized polyurethane, the method comprising (i) grafting a ω-bromocarboxylic acid with a urethane amino moiety of a polyurethane to form a ω-carboxyalkyl substituted polyurethane and (ii) grafting a geminal bisphosphonate amine with the ω-carboxyalkyl-substituted polyurethane to form the geminal bisphosphonate-derivatized polyurethane, wherein said geminal bisphosphonate amine has the structural formula:

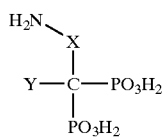

or an ionic form or salt thereof, wherein X is selected from the group consisting of $C_1$ to $C_{18}$ alkylene, $C_1$ to $C_{18}$ alkenylene, $C_1$ to $C_{18}$ arylene, $C_1$ to $C_{18}$ alkylene having one or more O, S, or N atoms incorporated into the alkylene chain, $C_1$ to $C_{18}$ alkenylene having one or more O, S, or N atoms incorporated into the alkenylene chain, and a heterocyclic radical, and wherein Y is not amino.

6. A polyurethane composition, comprising a polyurethane having a geminal bisphosphonate substituent pendant therefrom, wherein said geminal bisphosphonate substitutent is pendant from at least one urethane nitrogen of the backbone of the polyurethane.

7. The polyurethane composition of claim 6, wherein said geminal bisphosphonate substitutent is pendant from 0.5 to 40% urethane nitrogens of the backbone of the polyurethane.

8. The polyurethane composition of claim 7, wherein said geminal bisphosphonate substitutent is pendant from 1.0 to 20% urethane nitrogens of the backbone of the polyurethane.

9. The polyurethane composition of claim 8, wherein said geminal bisphosphonate substitutent is pendant from 5.0 to 10% urethane nitrogen of the backbone of the polyurethane.

10. The method of claim 1, wherein said geminal bisphosphonate thiol is selected from the group consisting of 2-mercaptoethylidene-1, 1-bisphosphonic acid and 2-(3-mercaptopropylthio)-ethylidene-1, 1-bisphosphonic acid.

11. The method of claim 3, wherein said ω-bromocarboxylic acid is selected from the group consisting of a ω-bromohexanoic acid or ω-bromoundecanoic acid.

* * * * *